US012695121B2

(12) United States Patent
Muldoon et al.

(10) Patent No.: US 12,695,121 B2
(45) Date of Patent: Jul. 28, 2026

(54) NON-AQUEOUS ELECTROLYTES FOR BATTERIES

(71) Applicant: Toyota Motor Engineering & Manufacturing North America, Inc., Plano, TX (US)

(72) Inventors: John G. Muldoon, Saline, MI (US); Patrick J. Bonnick, Ann Arbor, MI (US); Mikhail Redko, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 680 days.

(21) Appl. No.: 17/586,302

(22) Filed: Jan. 27, 2022

(65) Prior Publication Data

US 2023/0238582 A1     Jul. 27, 2023

(51) Int. Cl.
| | |
|---|---|
| *H01M 10/0569* | (2010.01) |
| *H01M 10/0567* | (2010.01) |
| *H01M 10/0568* | (2010.01) |

(52) U.S. Cl.
CPC ... *H01M 10/0569* (2013.01); *H01M 10/0567* (2013.01); *H01M 10/0568* (2013.01); *H01M 2300/0037* (2013.01)

(58) Field of Classification Search
CPC .. H01M 4/136; H01M 4/1397; H01M 10/052; H01M 10/0525; H01M 10/0567; H01M 10/0568; H01M 10/0569
See application file for complete search history.

(56) References Cited

U.S. PATENT DOCUMENTS

| | | |
|---|---|---|
| 7,776,385 B2 | 8/2010 | Muldoon et al. |
| 8,383,190 B2 | 2/2013 | Muldoon et al. |
| | (Continued) | |

FOREIGN PATENT DOCUMENTS

| | | | | |
|---|---|---|---|---|
| CN | 113921911 A | * | 1/2022 | ........ H01M 10/0567 |
| EP | 3050872 A1 | * | 8/2016 | .......... C07C 311/09 |
| KR | 101108945 B1 | * | 1/2012 | ........ H01M 10/0567 |

OTHER PUBLICATIONS

Wu et al., Sulfone-based high-voltage electrolytes for high energy density rechargeable lithium batteries: progress and perspective. Chin. Chem. Lett., 32 (2021), pp. 1309-1315 (Year: 2021).*

(Continued)

*Primary Examiner* — Allison Bourke
*Assistant Examiner* — Travis L. Martin
(74) *Attorney, Agent, or Firm* — Christopher G. Darrow; Darrow Mustafa PC

(57) ABSTRACT

A non-aqueous electrolyte, with a coulombic efficiency with respect to lithium of at least 80%, that includes a Group 1 salt dissolved in a mixture containing two sulfone compounds, a mixture containing a sulfone compound and a sultone compound, and/or a mixture containing a sulfone compound and a sulfonamide compound. The Group 1 salt can be a lithium salt, the sulfone compound can be a cyclic sulfone such as thietane-1,1-dioxide and sulfolane, the sultone compound can be a cyclic sultone such as 1,3-propane sultone, and the sulfonamide compound can be a partially fluorinated sulfonamide such as 1,1,1-trifluoro-N,N-dimethylmethanesulfonamide and N-butyl-1,1,1-trifluoro-N-methylmethanesulfonamide. Additives such as another lithium salt, a polyunsaturated compound, a cyclic anhydride, a cyclic unsaturated sultone, and/or a cyclic phosphate can be included in the non-aqueous electrolyte.

13 Claims, 16 Drawing Sheets

(56)  References Cited

U.S. PATENT DOCUMENTS

| | | | |
|---|---|---|---|
| 8,840,688 B2 | 9/2014 | Star et al. | |
| 2011/0020712 A1 | 1/2011 | Angell et al. | |
| 2011/0143212 A1 | 6/2011 | Angell et al. | |
| 2016/0259199 A1 | 9/2016 | Zhao | |
| 2019/0221851 A1 | 7/2019 | Muldoon et al. | |
| 2019/0334208 A1 | 10/2019 | Nakazawa et al. | |
| 2019/0386363 A1* | 12/2019 | Shao-Horn | H01M 12/02 |
| 2020/0099046 A1 | 3/2020 | Muldoon et al. | |
| 2020/0099090 A1* | 3/2020 | Li | H01M 10/058 |
| 2020/0274199 A1* | 8/2020 | Watarai | H01G 11/06 |
| 2021/0020986 A1* | 1/2021 | Shen | H01M 10/0565 |
| 2023/0174469 A1* | 6/2023 | Singh | C07C 311/09 |
| | | | 564/96 |
| 2024/0128514 A1* | 4/2024 | Shao-Horn | H01M 10/0567 |

OTHER PUBLICATIONS

Chem. Int. Ed. 2020, 59, 22194 (Year: 2020).*
J. Phys. Chem. C, 116 (2012), pp. 23915-23920 (Year: 2012).*

CN113921911A translation (Year: 2022).*
KR101108945B1 translation (Year: 2007).*
Ren et al., "Localized High-Concentration Sulfone Electrolytes for High-Efficiency Lithium-Metal Batteries," Chem, vol. 4, issue 8, 2018, pp. 1877-1892.
Su et al., "Oxidatively Stable Fluorinated Sulfone Electrolytes for High Voltage High Energy Lithium-ion Battery," Energy & Environmental Science, Issue 4, 2017, 7 pages.
Alvarado et al., "A Carbonate-free, Sulfone-based Electrolyte for High Voltage Li-ion Batteries," Materials Today, vol. 21, issue 4, 2018, pp. 341-353.
Fu et al., "Lithium Nitrate Regulated Sulfone Electrolytes for Lithium Metal Batteries," Angew. Chem. Int. Ed., vol. 132, issue 49, Dec. 2020, 9 pages.
Zhang et al., "Towards practical lithium-metal anodes," Chem. Soc. Rev., 49, 2020, pp. 3040-3071.

* cited by examiner

Lithium salt
LiFSI = lithium bis(fluorosulfonyl)imide

Lithium salt
LiTFSI = lithium bis(trifluoromethanesulfonyl)imide

Heterocyclic acetal
DOL = 1,3-dioxolane

Linear diether
DME = 1,2-dimethoxyethane

Cyclic sulfone
TT = thietane-1,1-dioxide

Cyclic sultone
PST = 1,3-propane sultone

Cyclic sulfone
SL = sulfolane

Partially fluorinated sulfonamide
CF₃-SO₂-NMe₂ = 1,1,1-trifluoro-N,N-dimethylmethanesulfonamide Partially fluorinated sulfonamide
CF₃-SO₂-NMeBu = N-butyl-1,1,1-trifluoro-N-methylmethanesulfonamide Cyclic carbonate
EC = ethylene carbonate

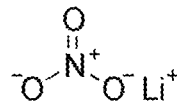

Lithium salt
LiNO₃ = lithium nitrate

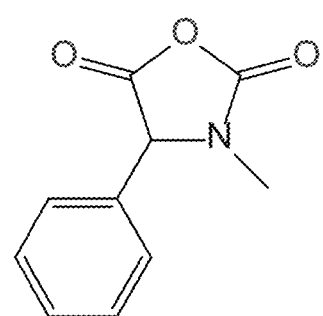

Polyunsaturated compound
TAC = triallyl cyanurate

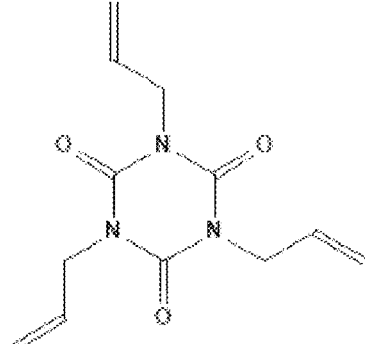

Polyunsaturated compound
TAIC = triallyl isocyanurate

Cyclic anhydride
MPOD = 3-methyl-4-phenyl-oxazolidine-2,5-dione

Cyclic unsaturated sultone
1PST = 1-propene-1,3-sultone

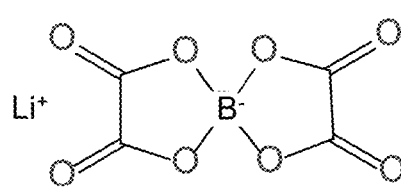

Lithium salt
LiBOB = lithium bis(oxalate)borate

Cyclic phosphate
PYD
2-(2-propen-1-yloxy)-1,3,2-dioxaphospholane-2-oxide

FIG. 37

NON-AQUEOUS ELECTROLYTES FOR BATTERIES

TECHNICAL FIELD

The present disclosure relates generally to battery electrolytes and particularly to non-aqueous electrolytes for rechargeable batteries.

BACKGROUND

The development of high energy rechargeable batteries, particularly lithium-ion batteries, has enabled the development and commercialization of portable electronics, power tools, and electric vehicles (EVs). However, consumer demand for portable electronics (e.g., cell phones) that "stay charged longer", rechargeable batteries with increased battery life, and lower cost EVs continues to drive a need for higher energy rechargeable batteries.

The present disclosure addresses issues related to high energy rechargeable batteries, and other issues related to batteries.

SUMMARY

This section provides a general summary of the disclosure, and is not a comprehensive disclosure of its full scope or all of its features.

In one form of the present disclosure, a non-aqueous electrolyte includes a Group 1 salt dissolved in a mixture of at least two sulfone compounds, a mixture of a sulfone compound and a sultone compound, or a mixture of a sulfone compound and a sulfonamide compound. Also, non-aqueous electrolyte supports a coulombic efficiency, with respect to plating and stripping of lithium, of at least 80%.

In another form of the present disclosure, a non-aqueous electrolyte includes a lithium salt dissolved in a mixture of at least two sulfone compounds, a mixture of a sulfone compound and a sultone compound, or a mixture of a sulfone compound and a sulfonamide compound. Also, non-aqueous electrolyte supports a coulombic efficiency, with respect to plating and stripping of lithium, of at least 80%.

In still another form of the present disclosure, a non-aqueous electrolyte includes a lithium salt dissolved in a mixture of a sulfone compound and a sulfonamide compound. The sulfone compound is a cyclic sulfone selected from thietane-1,1-dioxide, 1,3-propane sultone, and sulfolane, and the sulfonamide compound is a partially fluorinated sulfonamide selected from 1,1,1-trifluoro-N,N-dimethylmethanesulfonamide and N-butyl-1,1,1-trifluoro-N-methylmethanesulfonamide.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 37 shows still yet additional chemical structure depictions for compounds in non-aqueous electrolytes according to the teachings of the present disclosure.

DETAILED DESCRIPTION

The present disclosure provides electrolyte formulations (also referred to herein simply as "electrolytes" or "electrolyte") that promote highly reversible stripping and plating of lithium metal, support a high ionic conductivity, and are stable up to a potential greater than 5 V vs $Li/Li^+$. The electrolytes contain group 1 alkali salts (e.g., salts of lithium, sodium, and/or potassium) dissolved in a blend of high-dielectric organic sulfone solvents. In some variations, an electrolyte includes a mixture of two or more sulfones, one of which is a cyclic sulfone. In other variations, an electrolyte includes a mixture of a sulfone and a sultone, e.g., a cyclic sulfone and a cyclic sultone. And in at least one variation, an electrolyte includes a mixture of a sulfone, e.g., a cyclic sulfone, and a sulfonamide. And some variations, one or more additives are included in the electrolytes.

The sulfone-based electrolytes according to the teachings of the present disclosure exhibit improved or enhanced coulombic efficiency (CE), $Li^+$ conductivity, and oxidative stability compared to ether or carbonate-based electrolytes, including such ether or carbonate-based electrolytes utilizing $LiNO_3$ or high lithium salt concentrations. In addition, in some variations the sulfone-based electrolytes utilize sulfones with a high melting point (e.g., thietane-1,1-dioxide) such that electrolytes with low volatility and a low flash point relative to carbonates and especially ethers are provided.

Figure 1:
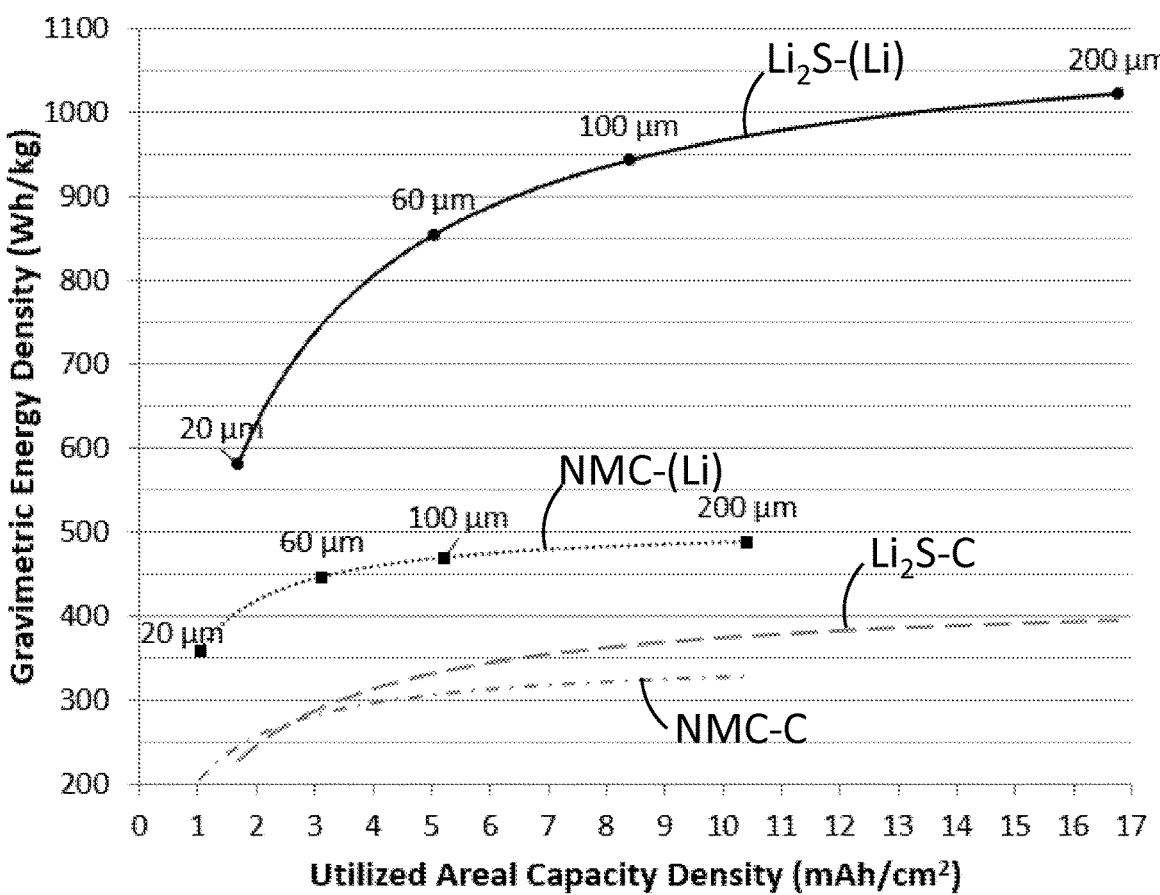
FIG. 1 shows the modeled gravimetric energy density versus reversible areal capacity of battery cells with NMC or sulfur cathodes and graphite or lithium metal anodes.

Not being bound by theory, commercial lithium-ion batteries offer high stability upon cycling at the expense of capacity storage by utilization of spectator host materials such as graphitic carbon in the anode. However, with the need and desire of increased battery capacity storage, studies have investigated replacement of such anode host materials with lithium metal. For example, Bonnick et al. modeled and compared energy densities of nickel-manganese-cobalt-oxide (NMC) battery cells with anodes formed from graphite (specific capacity of 339 mA h g$^{-1}$) versus anodes of lithium metal (specific capacity of 3861 mA h g$^{-1}$) and sulfur battery cells with anodes formed from graphite versus anodes formed of lithium metal (see P. Bonnick and J. Muldoon, *Energy Environ. Sci.*, 2020, 13, 4808). And as observed from FIG. 1 in the present disclosure, the NMC cell with the lithium metal anode provided an approximately 50% increase in energy density compared to the NMC cell with a graphite anode, and the sulfur cell with the lithium metal anode provided an approximately 150% increase in energy density compared to the sulfur cell with a graphite anode.

However, challenges exist with the use of lithium metal anodes. Particularly, lithium ions have a low standard reduction potential means that lithium metal readily donates its electrons to most other materials, including battery electrolytes. For example, the reduction of electrolytes on the surface of a lithium metal anode results in the formation of a solid electrolyte interface (SEI) that can be unstable and non-uniform due to rupturing and reformation throughout reversible plating of lithium. That is, a rigid SEI cannot withstand the mechanical stress caused by the uneven nucleation and dendrite growth or mossy deposition of lithium. Particularly, growth of dendrites on the surface of a lithium metal anode causes a rapid and large increase in the surface area of the anode and can lead to cell dry-out or shorting of the battery. And with each regeneration of the SEI, additional electrolyte is decomposed by reduction, which can be detected by measuring the coulombic efficiency (CE) between the deposition and dissolution of lithium. It should be understood that low coulombic efficiencies impact cycle life negatively. For example, a 50% coulombic efficiency renders half the deposited lithium unrecoverable after each cycle and quickly depletes the lithium in the battery. In addition to this electrochemically inactive lithium, rapid degradation of the electrolyte which occurs during SEI regeneration also limits cycle life.

Nevertheless, highly reversible lithium metal electrodes are desirable for realization of enhanced Li-ion battery technologies such as NMC-lithium metal, lithium air (Li-air) and lithium sulfur (Li—S) batteries. In addition, electrolytes with relatively high CE when cycling lithium metal are desirable for such batteries. In the case of lithium metal electrodes, CE is a measurement of the amount of lithium recovered during discharge divided by the amount of lithium deposited during a previous charge. Accordingly, the CE reflects how much lithium is or was irreversibly consumed in parasitic reactions with the electrolyte and is a desirable method to measure both the stability of an electrolyte in contact with a negative electrode and how the electrolyte affects the lifetime of a battery.

An electrolyte (including both the solvents and salts) that is more reductively stable, typically has a higher CE (compared to a less stable electrolyte) since a reductively stable electrolyte does not consume as much lithium compared to an unstable electrolyte, via unwanted parasitic reactions. For example, Li—S battery research is regularly performed using lithium bis(trifluoroethane-sulfonyl)imide (LiTFSI) in a binary mixture of 1,3-dioxolane (DOL) and 1,2-dimethoxyethane (DME) solvents with lithium nitrate (LiNO₃) as an additive (e.g., see U.S. Pat. No. 10,763,512 and C. B. Bucur, A. Lita, N. Osada and J. Muldoon, Energy Environ. Sci., 2016, 9, 112-116). And in contrast to carbonate solvents commonly found in Li-ion batteries, ethereal solvents are desirable for Li—S batteries since reduced lithium polysulfide species do not react with ethers (see, M. Barghamadi et al., Energy Environ. Sci., 2014, 7, 3902-3920).

The electrolyte additive, LiNO₃, has been shown to impede the lithium polysulfide shuttle in Li—S batteries and improve the CE of lithium metal electrodes, ostensibly through the addition of Li₃N to the SEI as a fast Li⁺ conductor). As such, LiNO₃ has become a staple additive in liquid electrolytes for Li—S batteries. However, LiNO₃ also continuously reacts with lithium metal over time, thickening the SEI, which increases cell resistance and eventually depletes itself, likely before the useful lifespan of the cell has passed.

At least one primary purpose of a CE-enhancing solvent, salt and/or additive is that when lithium or lithiated graphite first contacts a CE-enhanced electrolyte, all components contained therein should react with the lithium such that the most reactive components are incorporated into the lowest layers of the solid electrolyte interphase (SEI) (e.g., see E. Peled et al., J. Electrochem. Soc., 1998, 145, 3482). Also, components such as solvents, salts and/or additives are beneficial in an electrolyte if such components form SEIs that are uniform, fast Li⁺ conductors, poor electric conductors, and/or elastic or self-healing (e.g., see U.S. Pat. Nos. 7,776,385; 8,383,190; 8,840,688). Any component characteristic that limits SEI growth, resists cracking as lithium expands/contracts and/or minimally interferes with Li⁺ diffusion improves the CE of lithium metal electrodes. (e.g., see US 2020/0099046 A1; US 2019/0221851 A1).

In order to address the challenges noted above with respect to the use of lithium metal anodes, novel sulfone-based electrolytes were developed and compared to conventional electrolytes with respect to CE, ionic conductivity, transference number, Li+ conductivity, and oxidative stability. Particularly, a total of twenty-five (25) electrolyte formulations were subjected to CE testing, three (3) of the twenty-five electrolytes were subjected to ionic conductivity testing, two (2) of the electrolytes were subjected to Li⁺ transference number testing, and one (1) of the electrolytes was subjected to oxidative stability testing. The chemical structure depictions of the various components or compounds discussed below with respect to the twenty-five electrolytes are shown in FIGS. 34-37 for reference.

The twenty-five electrolyte formulations included lithium salts of lithium bis(trifluoromethanesulfonyl)imide (LiTFSI) or lithium bis(fluorosulfonyl)imide (LiFSI) and for the conventional electrolytes, LiTFSI or LiFSi was dissolved in a 1:1 mixture by volume of 1,3-dioxolane: 1,2-dimethoxyethane (1DOL:1DME). And for novel electrolyte formulations, LiTFSI or LiFSI was dissolved in:

an 80:20 mixture by weight of thietane-1,1-dioxide:1,3-propane sultone (80TT:20PST);

an 80:20 mixture by weight of thietane-1,1-dioxide:sulfolane (80TT:20SL);

an 80:20 mixture by weight of thietane-1,1-dioxide:1,1, 1-trifluoro-N,N-dimethylmethanesulfonamide (80TT: 20CF₃—SO₂—NMe₂);

an 80:20 mixture by weight of thietane-1,1-dioxide:N-butyl-1,1,1-trifluoro-N-methylmethanesulfonamide (80TT:20CF₃—SO₂—NMeBu);

a 50:50 mixture by weight of 1,3-propane sultone:sulfolane (50PST:50SL); and an 80:10:10 mixture by weight of thietane-1,1-dioxide:sulfolane:ethylene carbonate (80TT:10SL:10EC).

In addition, fourteen (14) of the electrolyte formulations included one or more of the following additives: LiNO₃; triallyl cyanurate (TAC); triallyl isocyanurate (TAIC); 3-methyl-4-phenol-oxazolidine-2,5-dione (MPOD); 1-propene-1,3-sultone (1PST); lithium bis(oxalate)borate (Li-BOB); and 2-(2-propen-1-yloxy)-1,3,2-dioxaphospholane-2-oxide (PYD).

Coulombic Efficiency

Figure 2:
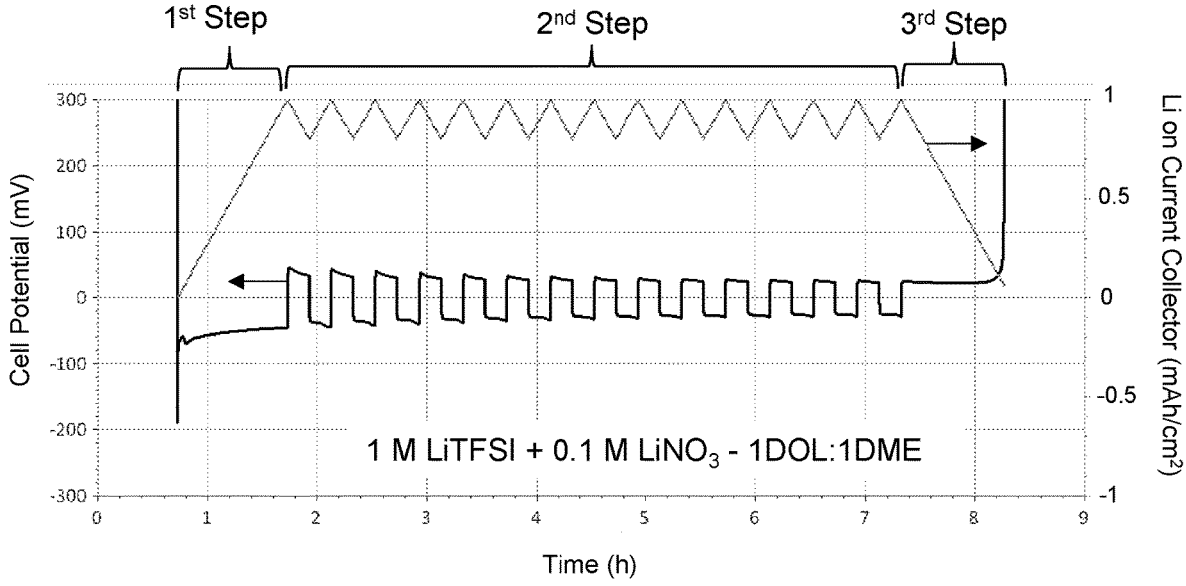
FIG. 2 shows the measurement of the average coulombic efficiency (CE) of stripping and plating lithium metal in the electrolyte: 1 M LiTFSI and 0.1 M LiNO$_3$ dissolved in 1:1 DOL:DME by volume.

Referring now to FIG. 2, average CE (also referred to herein simply as "CE") for a conventional ether-based electrolyte used in Li—S cells, and as measured per the teachings of B. D. Adams, J. Zheng, X. Ren, W. Xu and J.-G. Zhang, Adv. Energy Mater., 2018, 8, 1702097, is shown. Particularly, the electrolyte: 1 M LiTFSI and 0.1 M LiNO₃ dissolved in a 1:1 mixture by volume DOL:DME (1 M LiTFSI+0.1 M LiNO₃—1DOL:1DME) was subjected to CE testing by electroplating a large reservoir of lithium ($Q_T$) onto a current collector as a first step. Then a smaller amount ($Q_C$) of lithium is cycled back and forth between the electrodes for 'n' cycles as a second step such that lithium was plated and stripped from the lithium metal electroplated on the current collector rather than from the original surface of the current collector. And finally, the remaining lithium ($Q_S$) on the current collector is stripped off in a third step to reveal or provide the capacity of lithium that remains such that the average CE can be calculated form the equation:

$$CE_{avg} = \frac{nQ_C + Q_S}{nQ_C + Q_T} \qquad \text{Eqn. 1}$$

Figure 3:
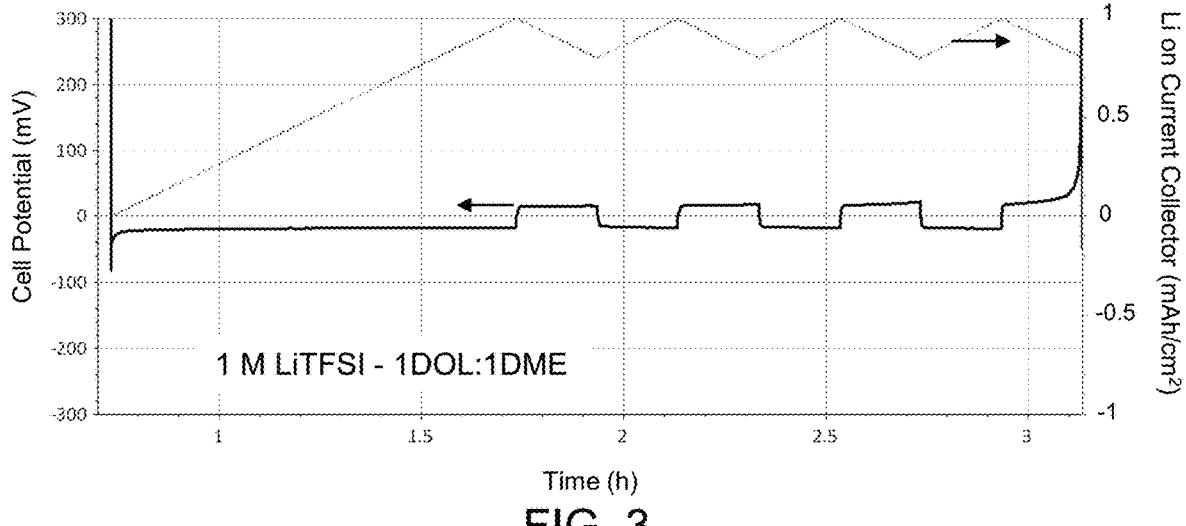
FIG. 3 shows the measurement of the average CE of stripping and plating lithium metal in the electrolyte: 1 M LiTFSI dissolved in 1:1 DOL:DME by volume.

Per the method described above, the 1 M LiTFSI+0.1 M LiNO$_3$ —1DOL:1DME supported a CE of 98.4%, i.e., 98.4% of the lithium was recovered each cycle and 1.6% was irreversibly lost due to reaction(s) with the electrolyte. Referring to FIG. 3, a measure of CE for the same electrolyte, without the addition of LiNO$_3$, is shown. That is, FIG. 3 shows a measure of average CE for the electrolyte 1 M LiTFSI—1DOL:1DME. And without the addition of the LiNO$_3$, the CE was reduced by about half to 49.9%. Accordingly, the presence or addition of LiNO$_3$ in conventional electrolytes is demonstrated by a comparison of FIGS. 2 and 3 and the corresponding CEs. However, since LiNO$_3$ can be depleted and results in an increase in cell resistance over time, it is desirable to remove LiNO$_3$ from an electrolyte formulation if a high CE can be maintained without it.

Figure 4:
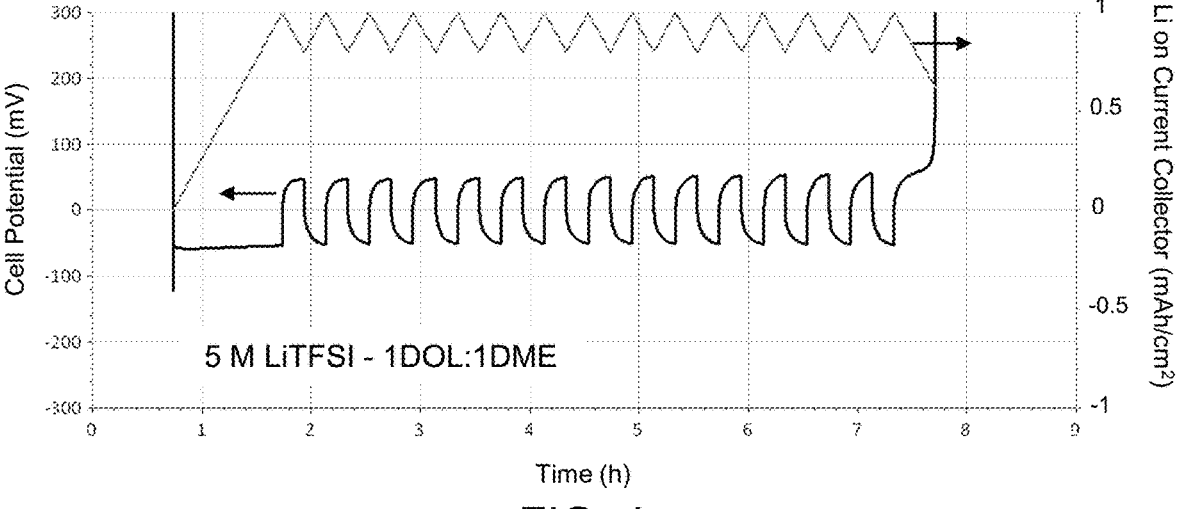
FIG. 4 shows the measurement of the average CE of stripping and plating lithium metal in the electrolyte: 5 M LiTFSI dissolved in 1:1 DOL:DME by volume.
Figure 5:
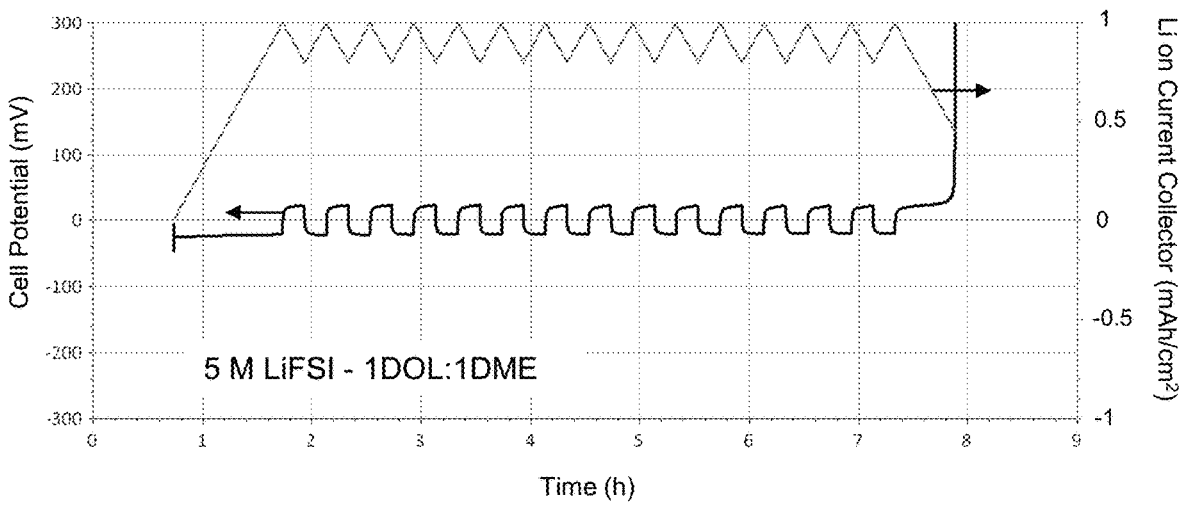
FIG. 5 shows the measurement of the average CE of stripping and plating lithium metal in the electrolyte: 5 M LiFSI dissolved in 1:1 DOL:DME by volume.

Referring to FIGS. 4 and 5, two examples of conventional electrolyte formulations without LiNO$_3$, but increased Li salt content (also known as "high concentration electrolytes"), were subjected to CE testing. FIG. 4 illustrates a CE measurement of 83.7% for the electrolyte 5 M LiTFSI—1DOL:1DME and FIG. 5 shows a CE measurement of 88.2% for the electrolyte 5 M LiFSI—1DOL:1DME. The LiFSI provides or results in a more stable SEI on the lithium metal substrate and/or current collector and thus provides a higher CE than the LiTFSI containing electrolyte.

Referring now to FIGS. 6-26, average CE measurements for sulfone-based electrolytes according to the teachings of the present disclosure are shown. As noted above, the sulfone-based electrolytes include a mixture of at least two sulfones, a mixture of a sulfone and a sultone, or a mixture of a sulfone and a sulfonamide. In some variations, the sulfone(s) can be a cyclic sulfone such as thietane-1,1-dioxide and sulfolane, among others, the sultone can be a cyclic sultone such as 1,3-propane sultone, among others, and/or the sulfonamide can be a partially fluorinated sulfonamide such as 1,1,1-trifluoro-N,N-dimethylmethanesulfonamide and N-butyl-1,1,1-trifluoro-N-methylmethanesulfonamide, among others. In addition, and as discussed in greater detail below, relatively small amounts of select organic compounds that affect the growth, structure, and/or stability of an SEI (generally referred to as additives) can be added and included in the sulfone-based electrolytes disclosed herein. Non-limiting examples of the additives include polyunsaturated compounds, cyclic unsaturated sultones, cyclic anhydrides, lithium salts, and cyclic phosphates.

Figure 6:
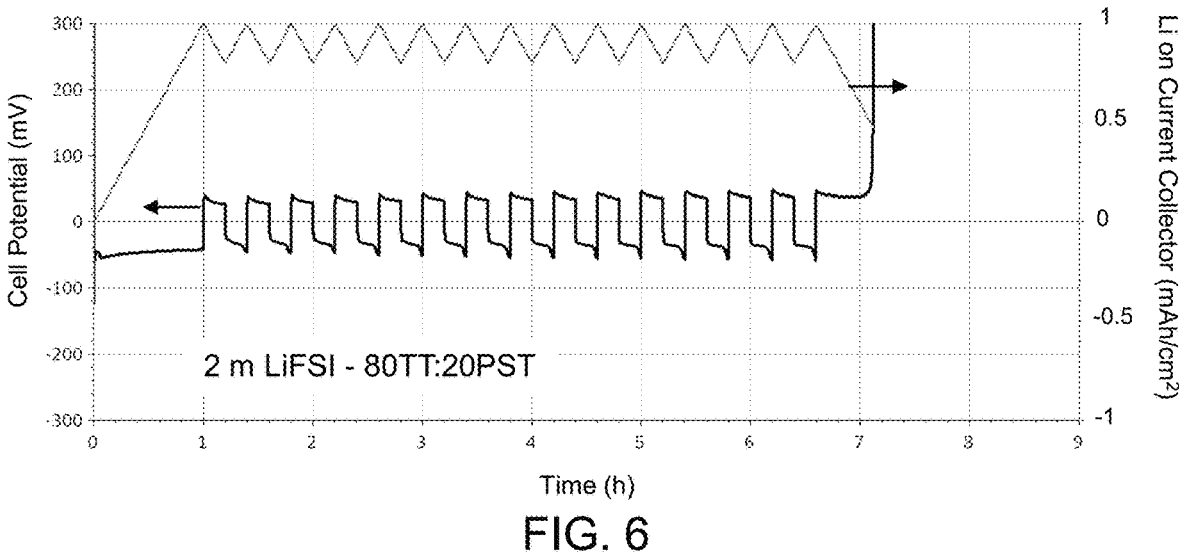
FIG. 6 shows the measurement of the average CE of stripping and plating lithium metal in the electrolyte: 2 M LiFSI dissolved in 80:20 thietane-1,1-dioxide:1,3-propane sultone by weight (80TT:20PST)

Referring particularly to FIG. 6, an electrolyte of 2 m LiFSI—80TT:20PST (i.e., 2 m LiFSI dissolved in a mixture of 80TT:20PST) supports a CE of 87.5%, which is approximately the same as the high concentration electrolyte 5 M LiFSI—1DOL:1DME (FIG. 4), but with less LiFSI. Stated differently, an electrolyte formulation of 2 m LiFSI—80TT:20PST supports a CE (87.5%) that is approximately the same as a high concentration electrolyte formulation of 5 M LiFSI—1DOL:1DME (88.2%).

Figure 7:
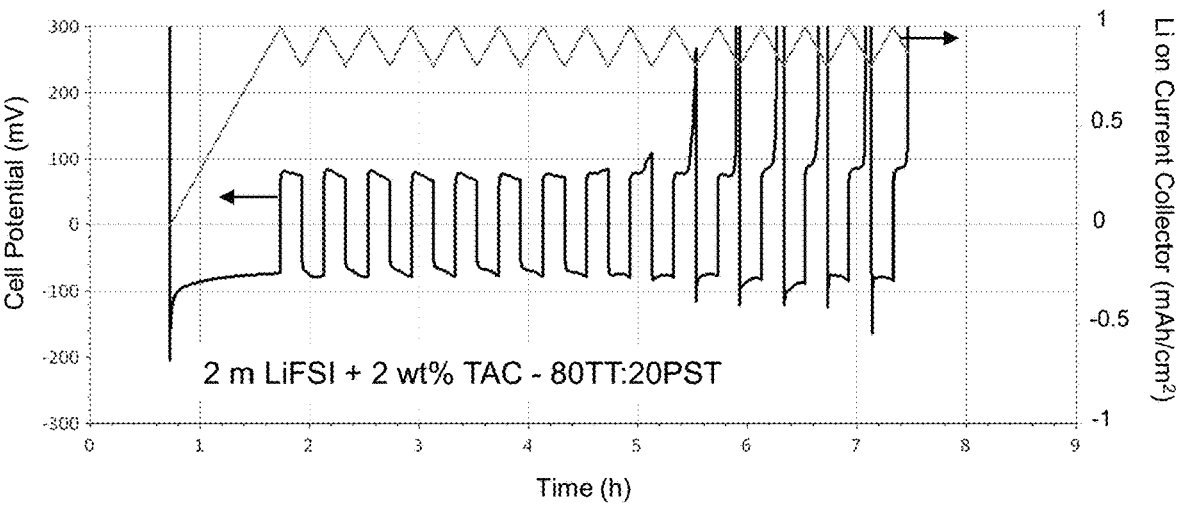
FIG. 7 shows the measurement of the average CE of stripping and plating lithium metal in the electrolyte: 2 M LiFSI and 2 wt % triallyl cyanurate dissolved in 80TT:20PST.
Figure 8:
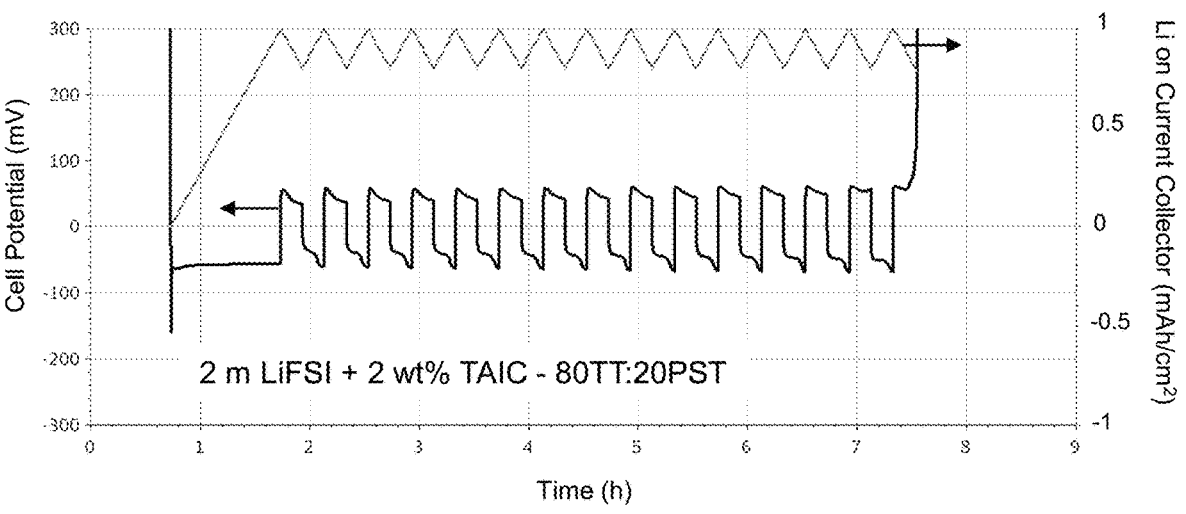
FIG. 8 shows the measurement of the average CE of stripping and plating lithium metal in the electrolyte: 2 M LiFSI and 2 wt % triallyl isocyanurate dissolved in 80TT:20PST.
Figure 9:
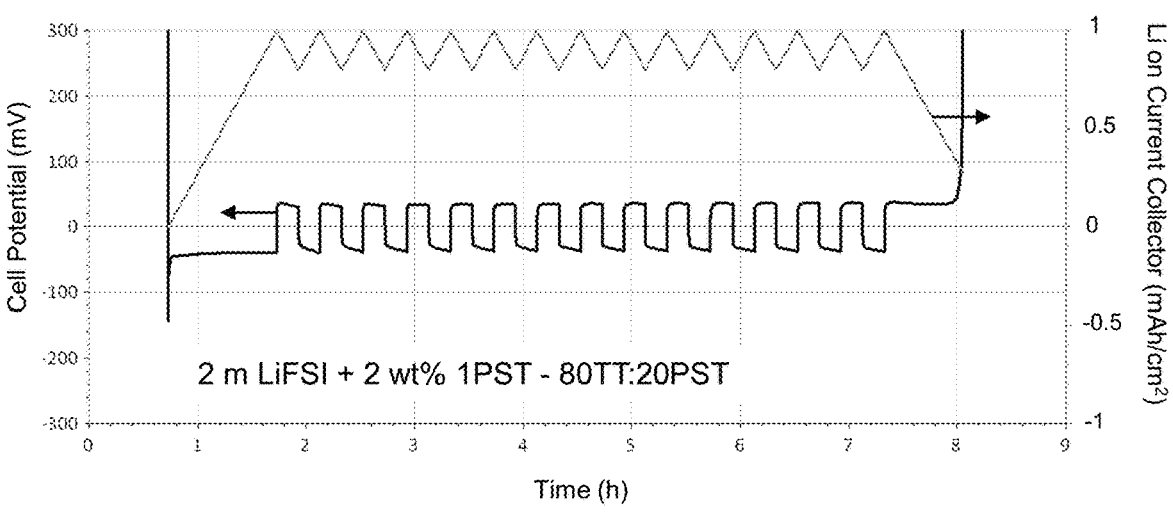
FIG. 9 shows the measurement of the average CE of stripping and plating lithium metal in the electrolyte: 2 M LiFSI and 2 wt % 1-propene-1,3-sultone dissolved in 80TT:20PST.
Figure 10:
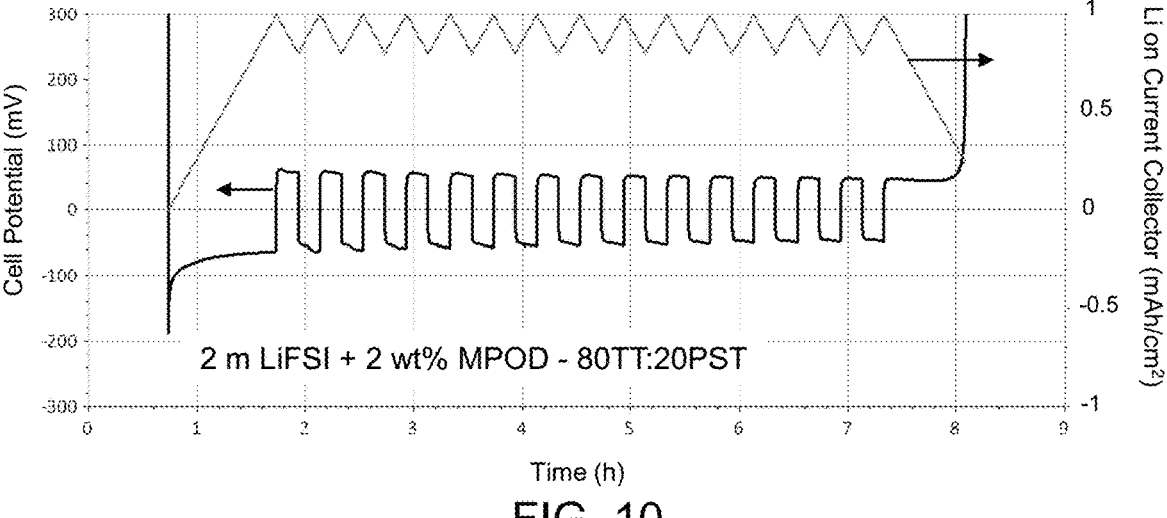
FIG. 10 shows the measurement of the average CE of stripping and plating lithium metal in the electrolyte: 2 M LiFSI and 2 wt % 3-methyl-4-phenol-oxazolidine-2,5-dione dissolved in 80TT:20PST.

Referring now to FIGS. 7-10, the effects of relatively small amounts of select organic compounds that affect the growth, structure, and/or stability of an SEI (generally referred to as additives) and affect the CE of the 2 m LiFSI—80TT:20PST electrolyte are shown. Particularly:

a 2 m LiFSI+2 wt % TAC—80TT:20PST supports a CE of 72.6% (FIG. 7);

a 2 m LiFSI+2 wt % TAIC—80TT:20PST electrolyte supports a CE of 79.5% (FIG. 8);

a 2 m LiFSI+2 wt % 1PST—80TT:20PST electrolyte supports a CE of 92.8% (FIG. 9); and a 2 m LiFSI+2 wt % MPOD—80TT:20PST electrolyte supports a CE of 93.8% (FIG. 10).

Figure 11:
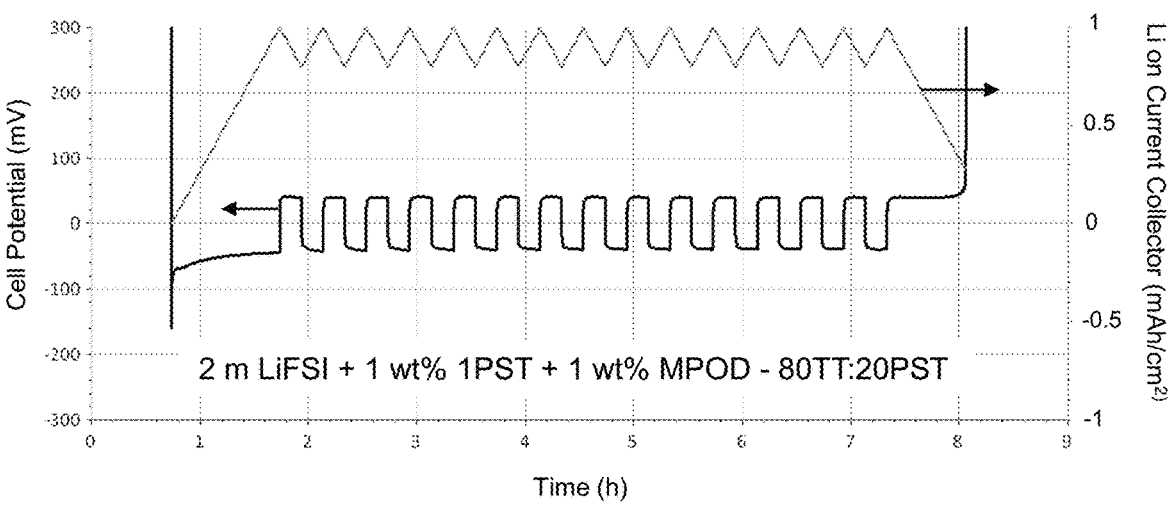
FIG. 11 shows the measurement of the average CE of stripping and plating lithium metal in the electrolyte: 2 M LiFSI, 1 wt % 1-propene-1,3-sultone, and 1 wt % 3-methyl-4-phenol-oxazolidine-2,5-dione dissolved in 80TT:20PST.
Figure 12:
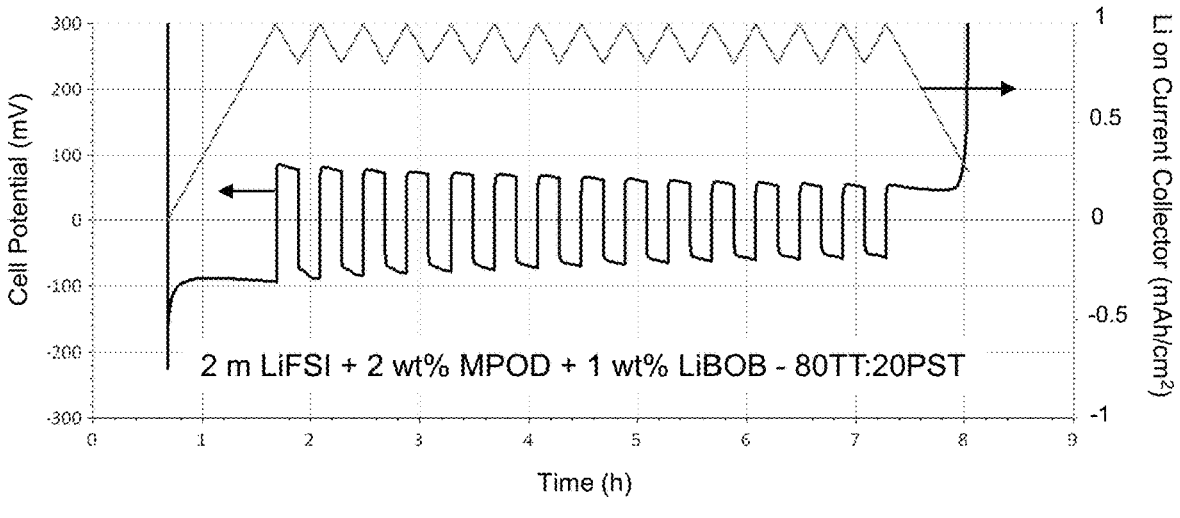
FIG. 12 shows the measurement of the average CE of stripping and plating lithium metal in the electrolyte: 2 M LiFSI, 2 wt % 3-methyl-4-phenol-oxazolidine-2,5-dione, and 1 wt % lithium bis(oxalate)borate dissolved in 80TT:20PST.
Figure 13:
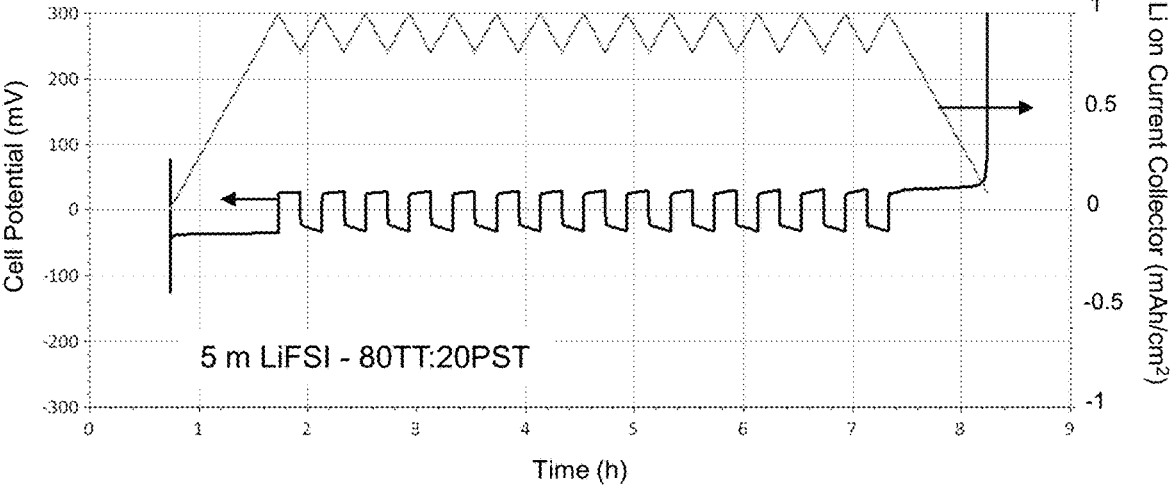
FIG. 13 shows the measurement of the average CE of stripping and plating lithium metal in the electrolyte: 5 M LiFSI dissolved in 80TT:20PST.

Also, the effects of combinations of additives is shown in FIGS. 11-12 with an electrolyte of 2 m LiFSI+1 wt % 1PST+1 wt % MPOD—80TT:20PST supporting a CE of 92.9% shown in FIG. 11, and an electrolyte of 2 m LiFSI+2 wt % MPOD+1 wt % LiBOB—80TT:20PST supporting an average CE of 93.5% shown in FIG. 12.

Figure 14:
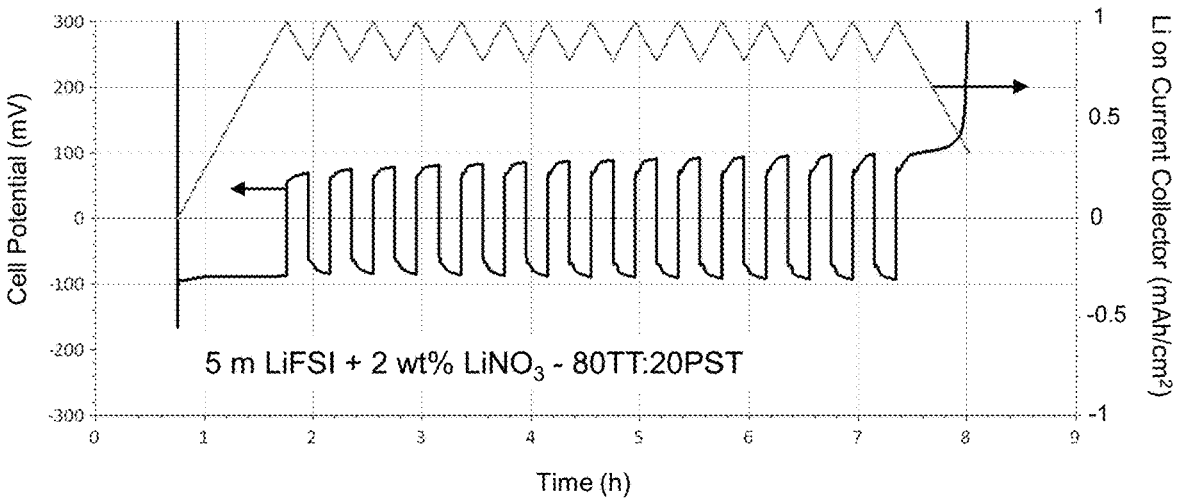
FIG. 14 shows the measurement of the average CE of stripping and plating lithium metal in the electrolyte: 5 M LiFSI and 2 wt % LiNO$_3$ dissolved in 80TT:20PST.
Figure 15:
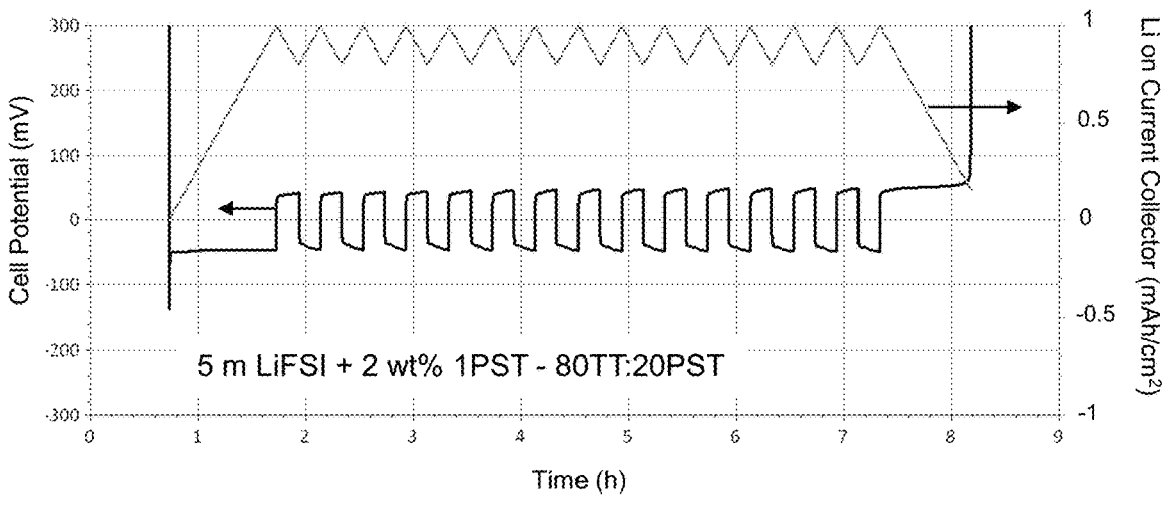
FIG. 15 shows the measurement of the average CE of stripping and plating lithium metal in the electrolyte 5 M LiFSI and 2 wt % 1-propene-1,3-sultone dissolved in 80TT:20PST.
Figure 16:
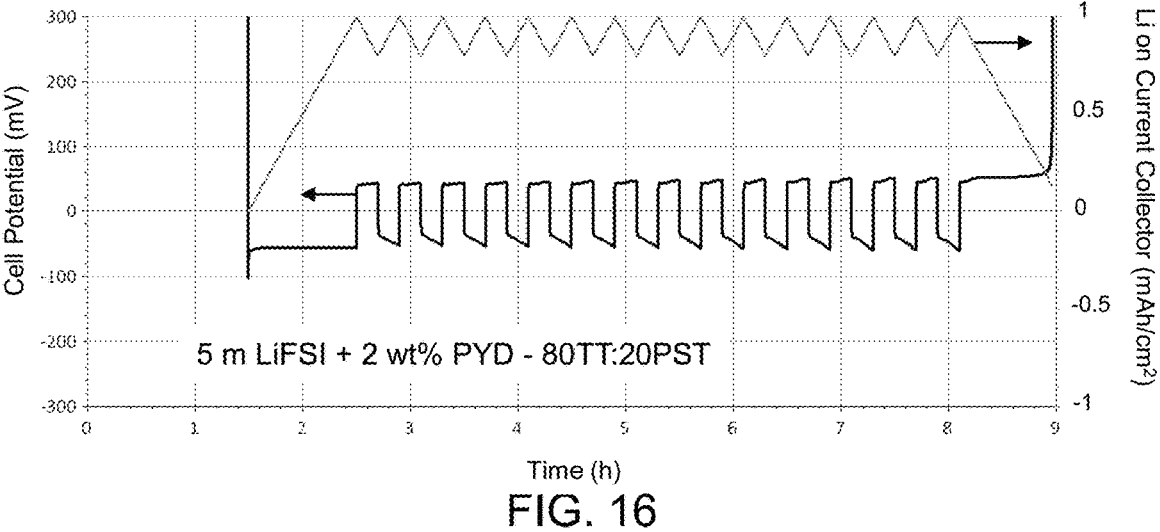
FIG. 16 shows the measurement of the average CE of stripping and plating lithium metal in the electrolyte: 5 M LiFSI and 2 wt % 2-(2-propen-1-yloxy)-1,3,2-dioxaphospholane-2-oxide dissolved in 80TT:20PST.
Figure 17:
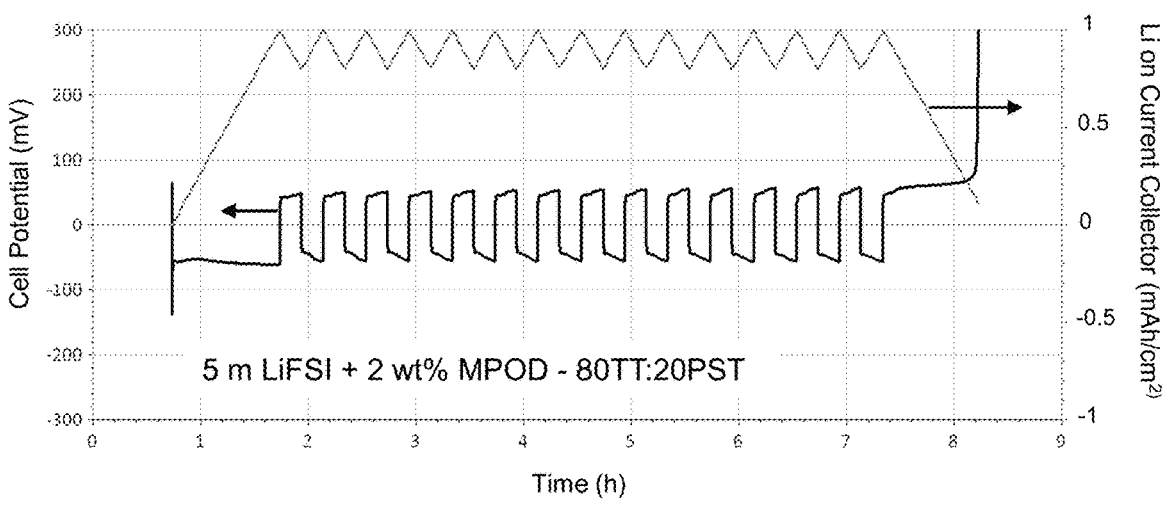
FIG. 17 shows the measurement of the average CE of stripping and plating lithium metal in the electrolyte: 5 M LiFSI and 2 wt % 3-methyl-4-phenol-oxazolidine-2,5-dione dissolved in 80TT:20PST.

Similar to improving the CE for carbonate and ether-based electrolytes, increasing the concentration of lithium salts increases the CE of the sulfone-based electrolytes disclosed herein. For example, and with reference to FIG. 13, by increasing the LiFSI concentration dissolved in 80TT:20PST from 2 m (FIG. 6) to 5 m (i.e., a 5 M LiFSI—80TT:20PST electrolyte) increases the CE from 87.5% to 97.6%. Also, additives affect the CE of the high concentration 5 m LiFSI sulfone-based electrolyte with:

a 5 m LiFSI+2 wt % LiNO$_3$ —80TT:20PST electrolyte yielding a CE of 91.4% (FIG. 14);

a 5 m LiFSI+2 wt % 1PST—80TT:20PST electrolyte yielding a CE of 96.0% (FIG. 15);

a 5 m LiFSI+2 wt % PYD—80TT:20PST electrolyte yielding a CE of 96.6% (FIG. 16); and a 5 m LiFSI+2 wt % MPOD—80TT:20PST electrolyte yielding a CE of 97.2% (FIG. 17).

Figure 18:
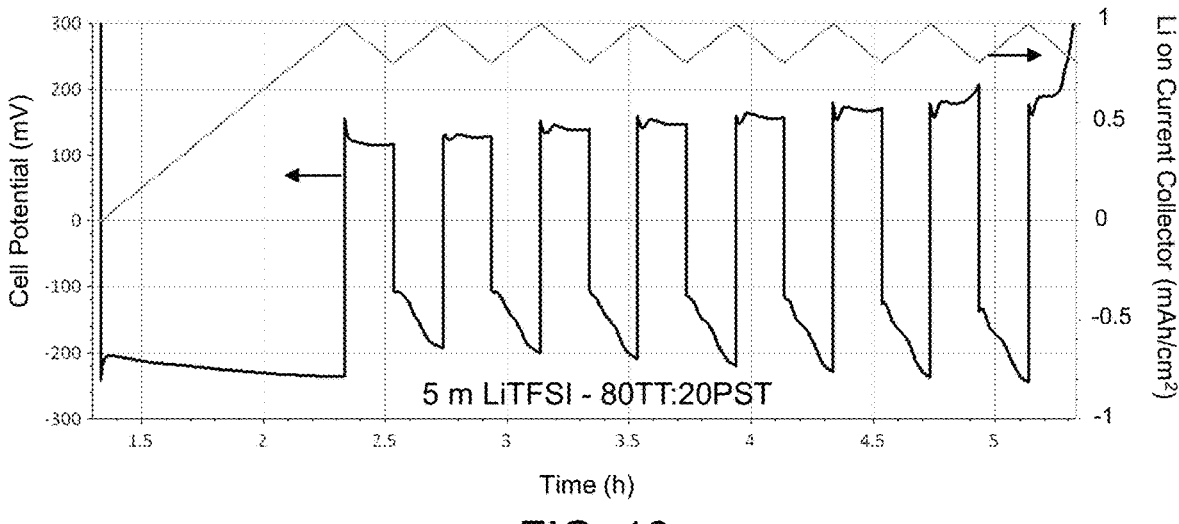
FIG. 18 shows the measurement of the average CE of stripping and plating lithium metal in the electrolyte: 5 M LiTFSI dissolved in 80TT:20PST.
Figure 19:
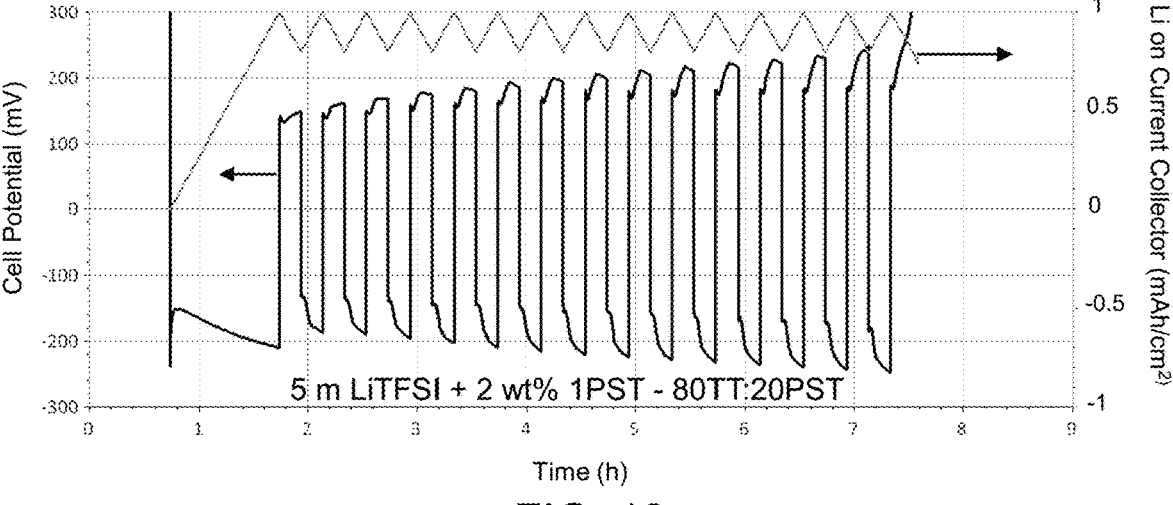
FIG. 19 shows the measurement of the average CE of stripping and plating lithium metal in the electrolyte: 5 M LiTFSI and 2 wt % 1-propene-1,3-sultone dissolved in 80TT:20PST.
Figure 20:
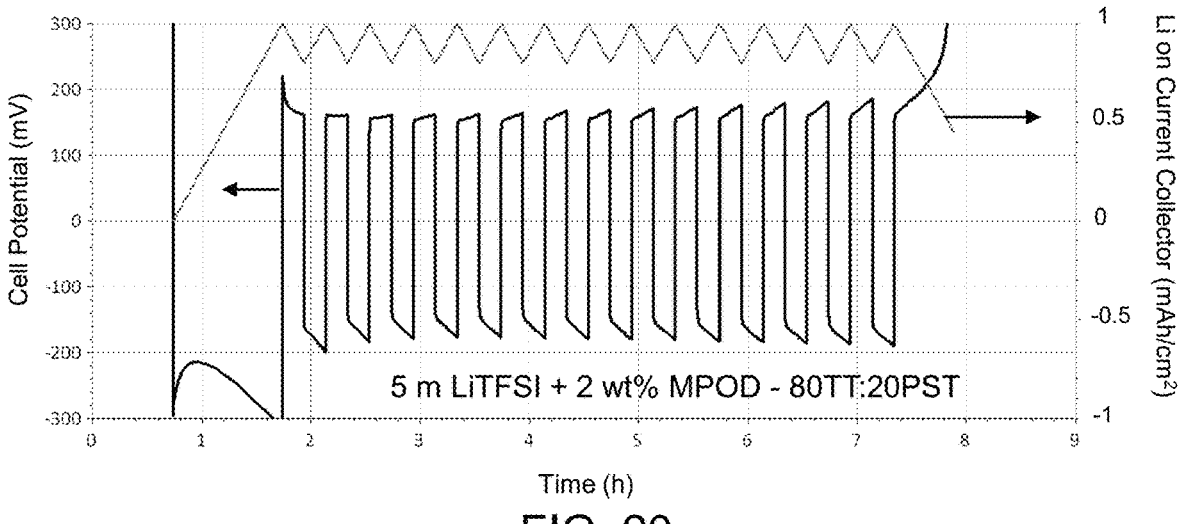
FIG. 20 shows the measurement of the average CE of stripping and plating lithium metal in the electrolyte: 5 M LiTFSI and 2 wt % 3-methyl-4-phenol-oxazolidine-2,5-dione dissolved in 80TT:20PST.

Regarding sulfone-based electrolytes with LiTFSI salt, a 5 m LiTFSI—80TT:20PST electrolyte yielded a CE of only 68.0% (FIG. 18). However, additives enhanced the CE of the 5 m LiTFSI—80TT:20PST electrolyte with the addition of 2 wt % 1PST to the 5 m LiTFSI—80TT:20PST electrolyte increasing the CE to 80.6% (FIG. 19), and the addition of 2 wt % MPOD to the 5 m LiTFSI—80TT:20PST electrolyte increasing the CE to 88.2% (FIG. 20).

Figure 21:
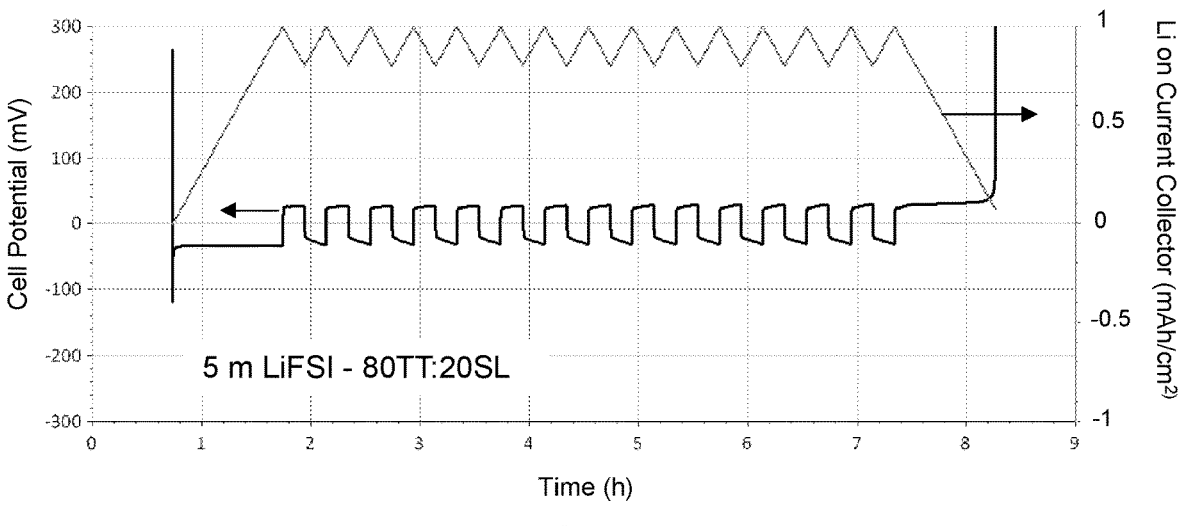
FIG. 21 shows the measurement of the average CE of stripping and plating lithium metal in the electrolyte: 5 M LiFSI dissolved in 80:20 thietane-1,1-dioxide:sulfolane by weight (80TT:20SL)
Figure 22:
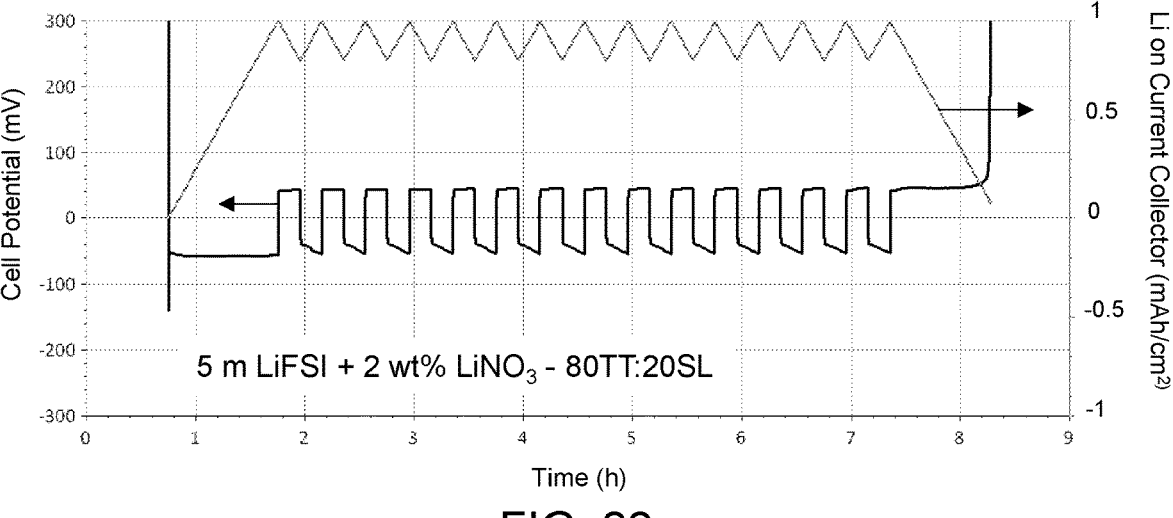
FIG. 22 shows the measurement of the average CE of stripping and plating lithium metal in the electrolyte: 5 M LiFSI and 2 wt % $LiNO_3$ dissolved in 80TT:20SL.

It should be understood that while the enhanced electrolytes discussed above utilize an 80TT:20PST mixture, other sulfone-based mixtures are included within the teachings of the present disclosure. For example, a sulfone mixture of 80TT:20SL was investigated and showed similar enhanced CE results. Particularly, FIG. 21 shows a CE of 98.2% for a 5 m LiFSI—80TT:20SL electrolyte and FIG. 22 shows a CE of 98.0% for a 5 m LiFSI+2 wt % LiNO$_3$—80TT:20SL electrolyte.

Figure 23:
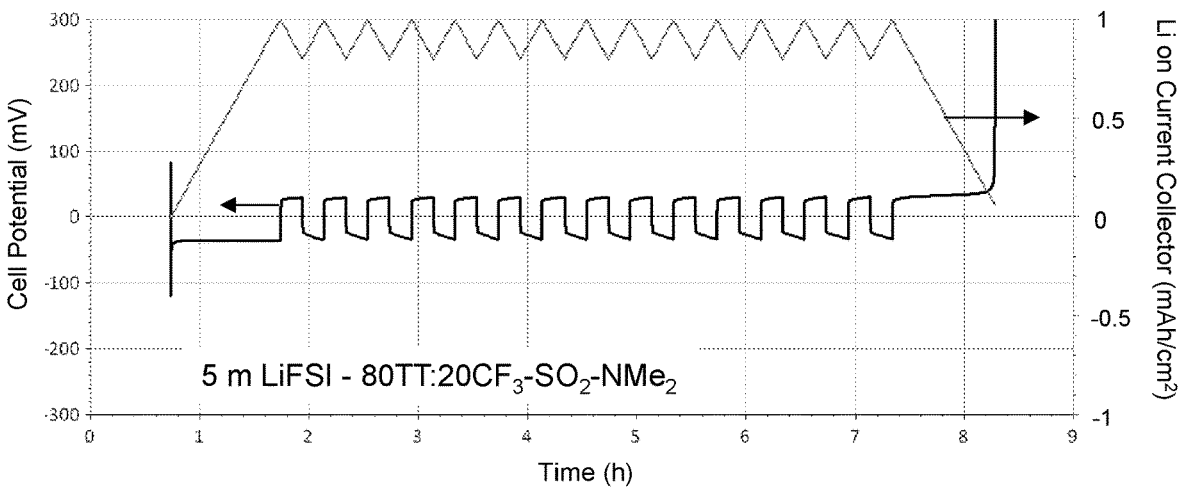
FIG. 23 shows measurement of average CE of stripping and plating lithium metal in the electrolyte: 5 M LiFSI dissolved in 80:20 thietane-1,1-dioxide:1,1,1-trifluoro-N,N-dimethylmethanesulfonamide by weight (80TT:20CF$_3$—SO$_2$—NMe$_2$)
Figure 24:
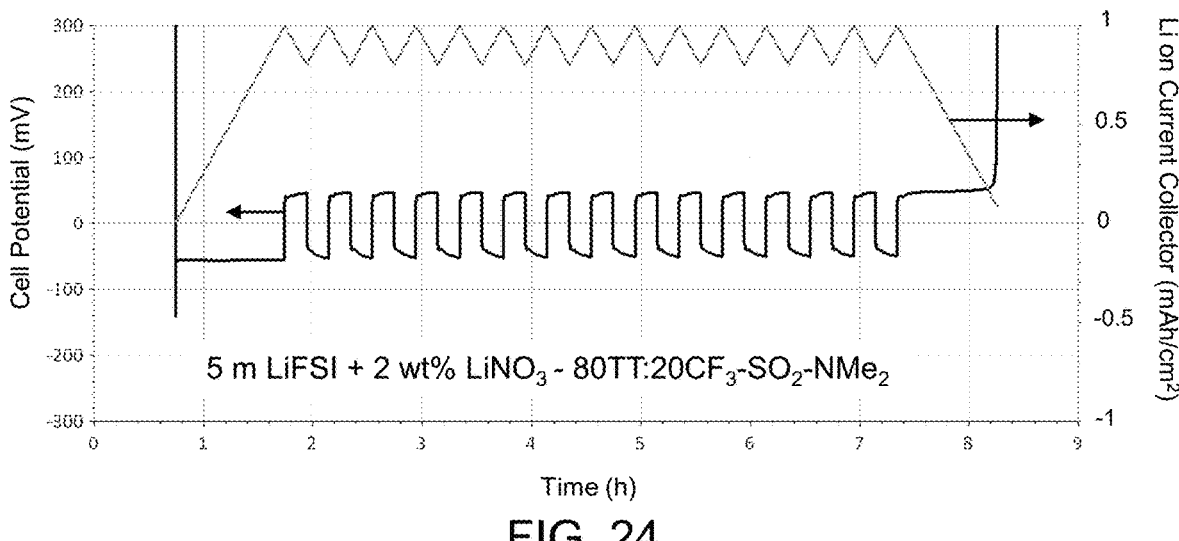
FIG. 24 shows the measurement of the average CE of stripping and plating lithium metal in the electrolyte: 5 M LiFSI and 2 wt % $LiNO_3$ dissolved in 80TT:20CF$_3$—SO$_2$—NMe$_2$.
Figure 25:
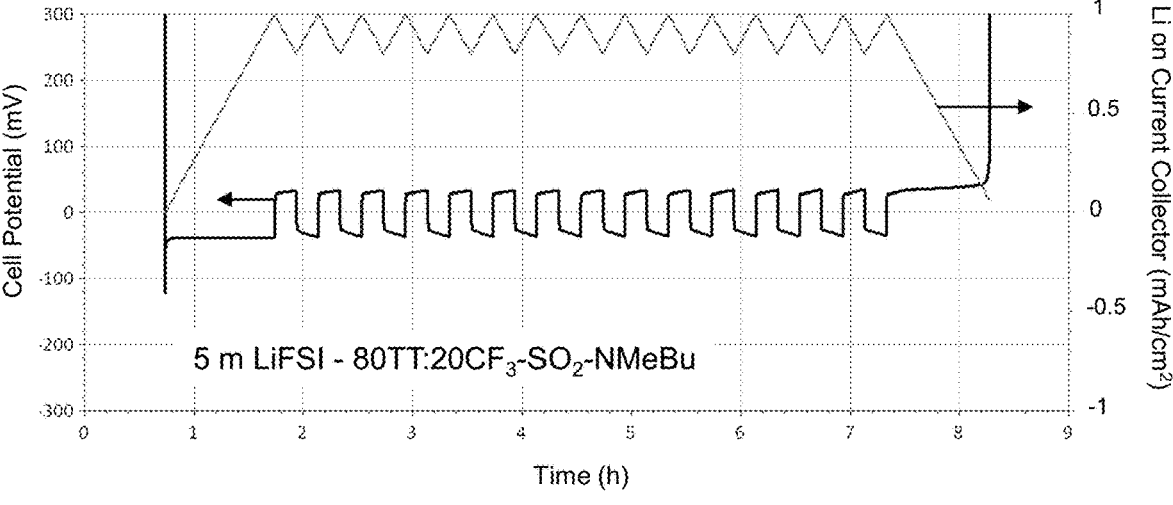
FIG. 25 shows the measurement of the average CE of stripping and plating lithium metal in the electrolyte: 5 M LiFSI dissolved in 80:20 thietane-1,1-dioxide:N-butyl-1,1,1-trifluoro-N-methylmethanesulfonamide by weight (80TT:20CF$_3$—SO$_2$—NMeBu)

And as noted above, in some variations the sulfone-based electrolytes include a sulfonamide, for example a partially fluorinated sulfonamide. Particularly, a 5 m LiFSI—80TT:20CF$_3$—SO$_2$—NMe$_2$ electrolyte was tested and yielded a CE of 98.6% (FIG. 23). Also, the addition of 2 wt % LiNO$_3$ to the 5 m LiFSI—80TT:20CF$_3$—SO$_2$—NMe$_2$ electrolyte had little effect, yielding a CE of 97.9% (FIG. 24). And substituting CF$_3$—SO$_2$—NMe$_2$ in the 5 m LiFSI—80TT: 20CF$_3$—SO$_2$—NMe$_2$ electrolyte with 20CF$_3$—SO$_2$—NMeBu also had little effect, yielding a CE of 98.5% (FIG. 25).

Figure 26:
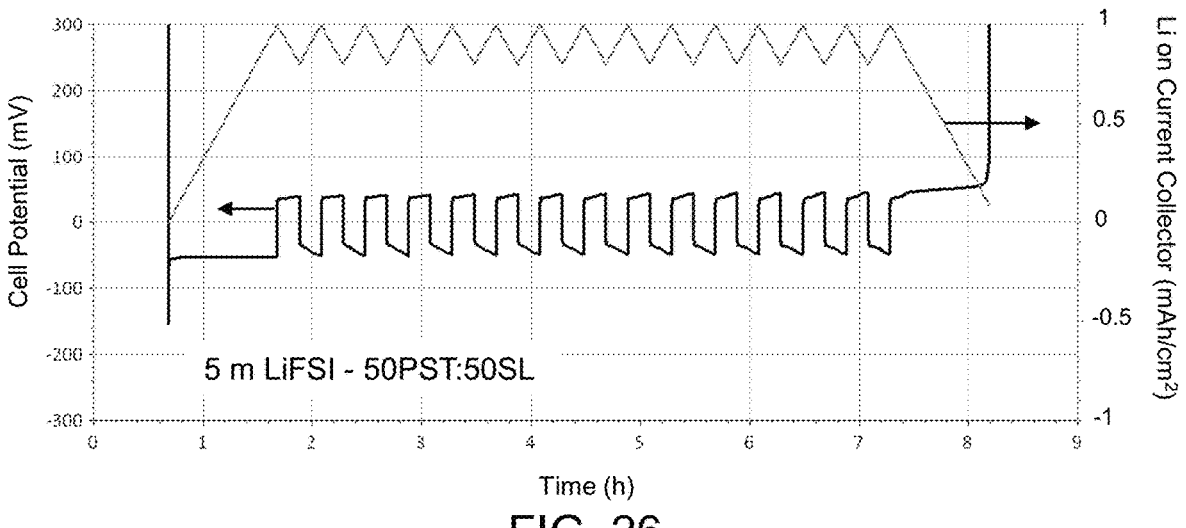
FIG. 26 shows the measurement of the average CE of stripping and plating lithium metal in the electrolyte: 5 M LiFSI dissolved in 50:50 1,3-propane sultone:sulfolane by weight (50PST:50SL)
Figure 27:
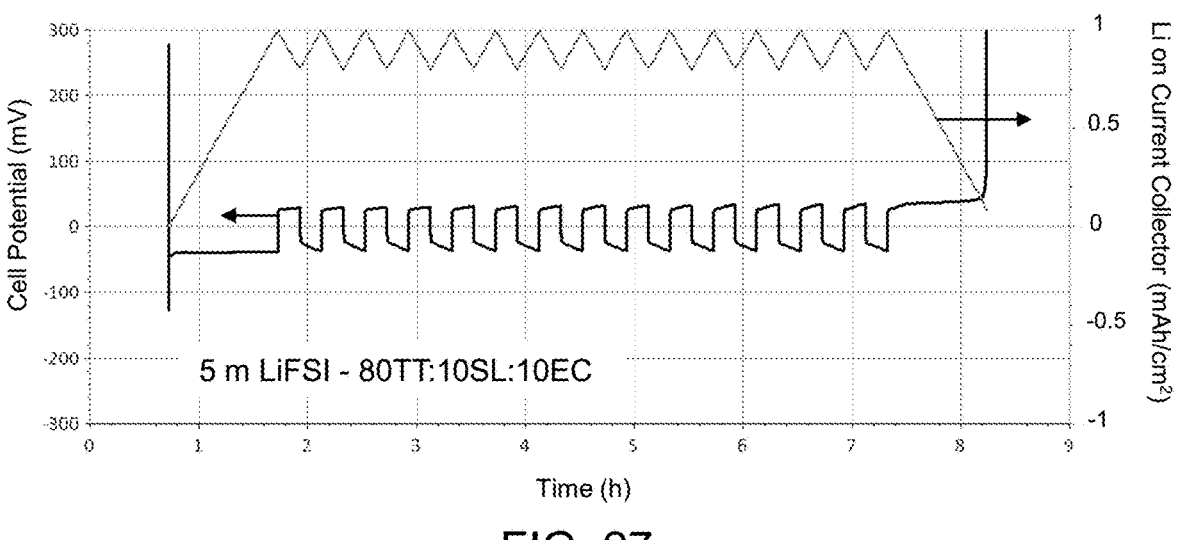
FIG. 27 shows the measurement of the average CE of stripping and plating lithium metal in the electrolyte: 5 M LiFSI dissolved in 80:10:10 thietane-1,1-dioxide:sulfolane:ethylene carbonate by weight (80TT:10SL:10EC)

It should also be understood that sulfone-based electrolytes disclosed herein need not contain thietane-1,1-dioxide. For example, an electrolyte of 5 m LiFSI—50PST:50SL was tested and yielded a CE of 97.7% (FIG. 26). And while the sulfone-based electrolytes discussed above do not contain carbonates, the presence of such other chemical classes does not necessarily decrease the CE of such electrolytes. For example, an electrolyte of 5 m LiFSI—80TT:10SL:EC was tested and yielded a CE of 97.7% (FIG. 27).

Accordingly, it should be understood that the sulfone-based electrolytes according to the teachings of the present disclosure exhibit enhanced CE compared to conventional ether-based and carbonate-based electrolytes Ionic Conductivity Ionic conductivity is another important parameter for electrolytes since ionic conductivity partially dictates the rate capability of a battery cell. Accordingly, the ionic conductivity was measured for three electrolytes using coin cells with a single layer of 19 mm-diameter glass fiber filter paper acting as a highly porous separator. The three electrolytes were 5 m LiFSI—80TT:20SL, 5 m LiFSI—80TT:20CF$_3$—SO$_2$—NMe$_2$ and 5 m LiFSI—80TT:20PST.

Prior to cell assembly, the thickness of the compacted separator was measured, and the coin cells were assembled by placing the separator into a cell canister, depositing 60 microliters (IL) of electrolyte onto the separator, and then placing a 1 mm-thick spacer, wave spring and cap on top. The coin cells were then crimped, and stainless-steel tabs were welded to the cap and canister.

Figure 28:
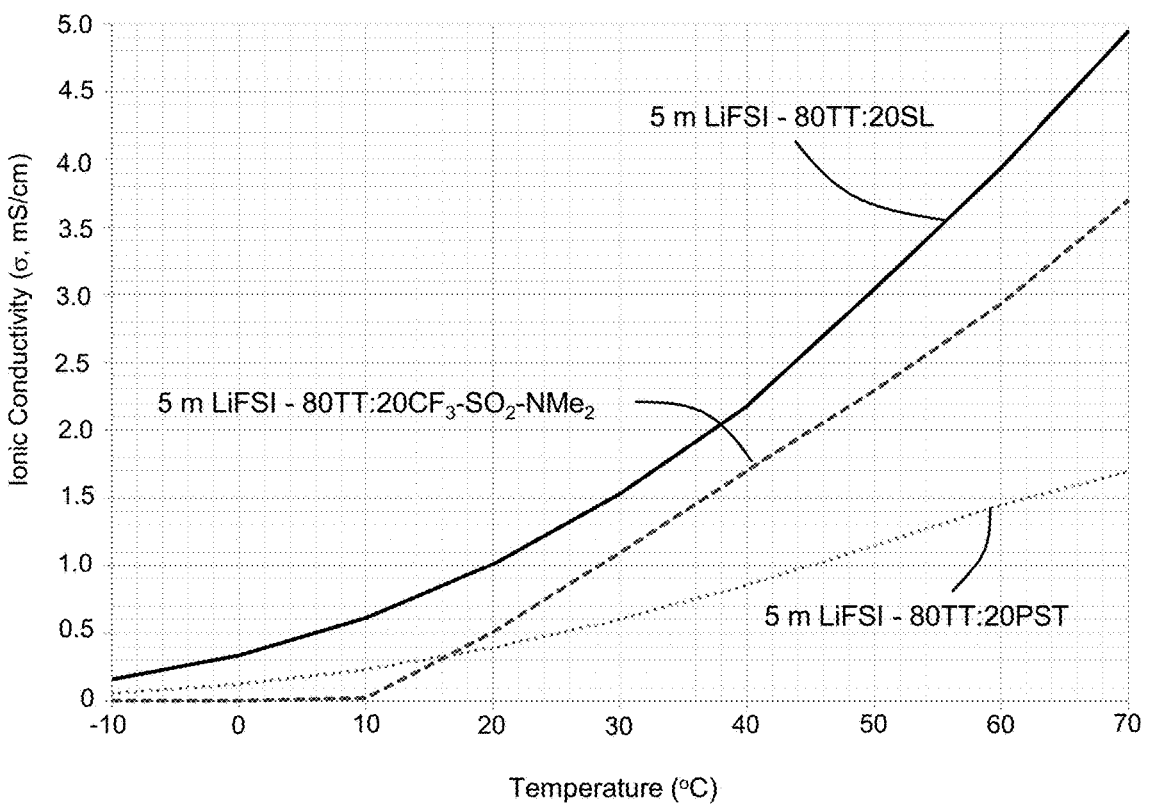
FIG. 28 shows the measurement of the ionic conductivity, as a function of temperature, of three electrolytes: 5 M LiFSI dissolved in 80TT:20SL (solid black line), 5 M LiFSI dissolved in 80TT:20CF$_3$—SO$_2$—NMe$_2$ (gray dashed line) and 5 M LiFSI dissolved in 80TT:20PST (gray dotted line)

The ionic conductivity as a function of temperature for the three electrolytes is shown in FIG. 28 with the 5 m LiFSI—80TT:20SL electrolyte supporting the highest ionic conductivity and reaching 1.28 mS/cm at 25° C. and 3.94 mS/cm at 60° C. The 5 m LiFSI—80TT:20CF$_3$—SO$_2$—NMe$_2$ electrolyte supported an ionic conductivity of 1.02 mS/cm at 25° C. and the 5 m LiFSI—80TT:20PST electrolyte supported an ionic conductivity of 0.51 mS/cm at 25° C.

Transference Number

Figure 29:
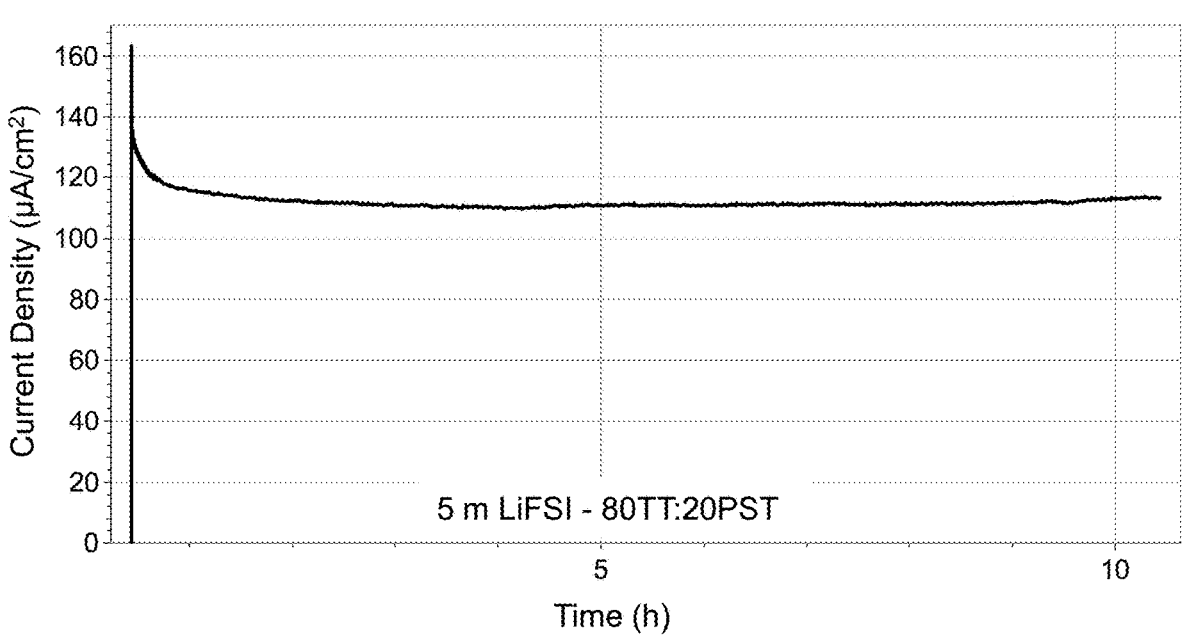
FIG. 29 shows the current density decay over a 10 h hold at 10 mV using the electrolyte: 5 M LiFSI dissolved in 80TT:20PST.
Figure 30:
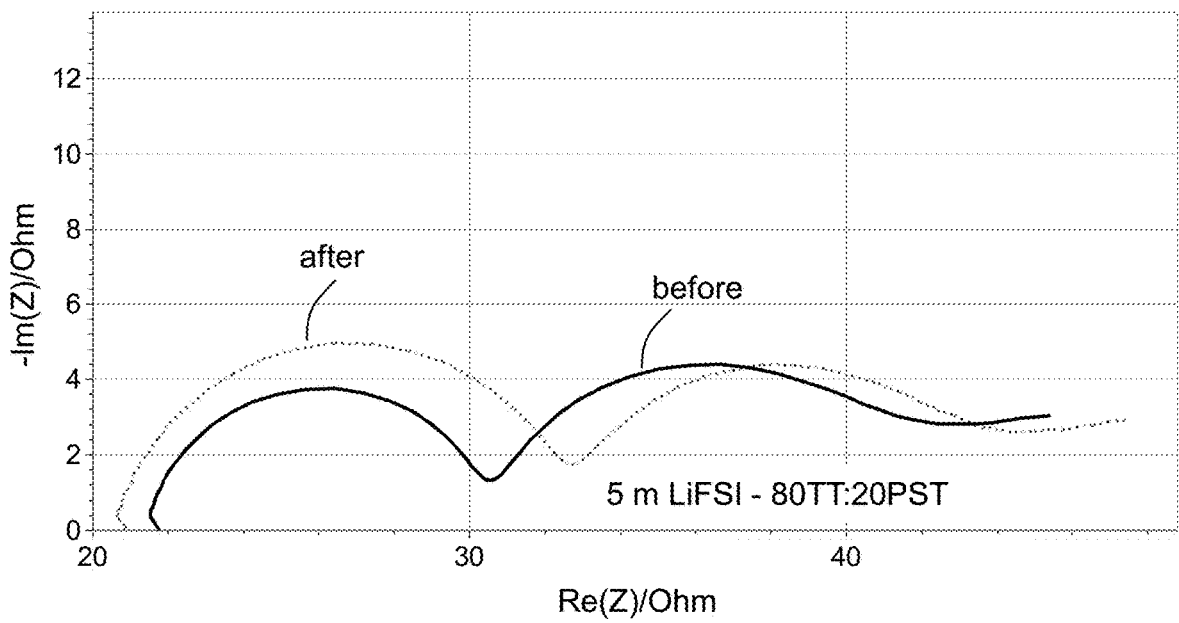
FIG. 30 shows the increase in cell resistance over a 10 h hold at 10 mV using the electrolyte: 5 M LiFSI dissolved in 80TT:20PST.

In addition to CE and ionic conductivity, transference number (t$_{Li+}$) measurements can reveal the fraction of the ionic current that is carried by Li$^+$ ions. And since most lithium batteries rely on the transfer of Li$^+$ from one electrode to the other in their operation, Li$^+$ conductivity is an important parameter in determining rate capability of an electrolyte. Accordingly, the transference number of a 5 m LiFSI—80TT:20PST electrolyte was using a Li/electrolyte/Li coin cell with a glass fiber filter paper separator by applying a potential difference of 10 mV for 10 h at 25° C. and monitoring the initial and final current densities. FIG. 29 shows the current density decay over 10 h and FIG. 30 shows the cell impedance both before (solid line) and after (dotted line) the 10 h potential-hold experiment. Also, the low frequency (left-most) semicircles in FIG. 30 represent the charge-transfer resistances. The initial resistance (Ro) and current density (I$_0$) were compared to the final resistance (R$_{SS}$) and current density (I$_{SS}$) to determine the transference number using the equation:

$$t_{Li^+} = \frac{I_{steady\ state}(\Delta V - I_o R_o)}{I_o(\Delta V - I_{SS} R_{SS})} \qquad \text{Eqn. 2}$$

The Li$^+$ transference number was determined to be 0.68 which is notably better than carbonate-based liquid electrolytes which typically exhibit Li$^+$ transference numbers of about 0.3 to 0.4.

Li$^+$ Conductivity

Multiplication of the ionic conductivity and the transference number allow for Li$^+$ conductivity values to be calculated. For example, the Li$^+$ conductivity of a 5 m LiFSI—80TT:20PST electrolyte was about 0.35 mS/cm at 25° C. within a glass fiber filter paper separator. In comparison, a commercial electrolyte of 1 m LiPF$_6$ in 1:1 (by weight) ethylene carbonate:ethyl methyl carbonate (LP50 from BASF), supported an ionic conductivity of about 10.6 mS/cm at room temperature. However, when the Li$^+$ transference number of 0.4 and a commercial separator were included, the Li$^+$ conductivity of the commercial carbonate electrolyte (i.e., LP50) was measured to be 0.24 mS/cm at room temperature (see, R. Zahn et al., *ACS Appl. Mater. Interfaces,* 2016, 8, 32637-32642).

Figure 31:
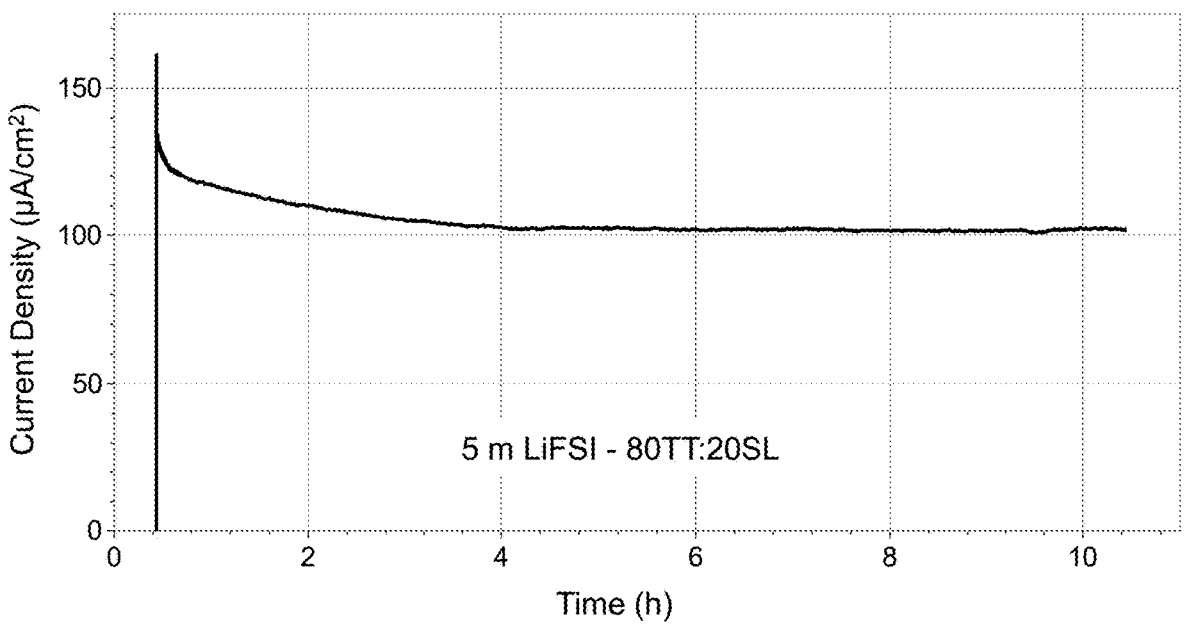
FIG. 31 shows the current density decay over a 10 h hold at 10 mV using the electrolyte: 5 M LiFSI dissolved in 80TT:20SL.
Figure 32:
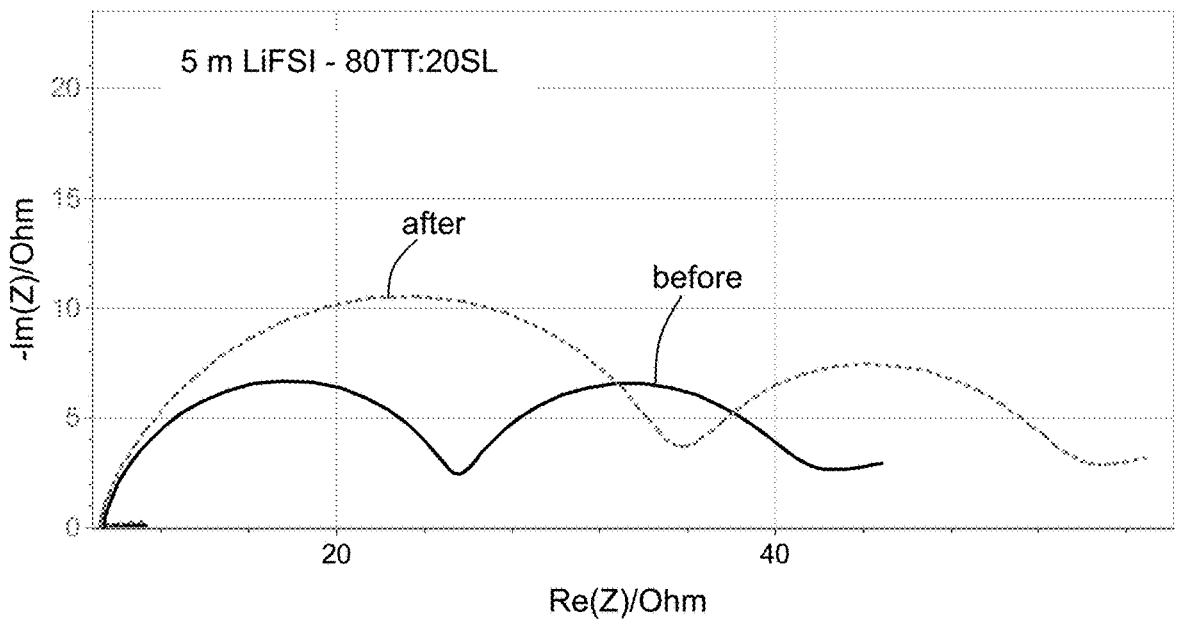
FIG. 32 shows the increase in cell resistance over a 10 h hold at 10 mV using the electrolyte: 5 m LiFSI dissolved in 80TT:20SL.

By increasing the ionic conductivity while maintaining the Li$^+$ transference number, the Li$^+$ conductivity of the electrolyte can be increased. FIG. 28 shows that the ionic conductivity of the 5 m LiFSI—80TT:20SL electrolyte at 25° C. is 1.28 mS/cm. To measure the Li$^+$ transference number of this electrolyte, a Li/electrolyte/Li coin cell, using a glass fiber filter paper separator, was subjected to a potential difference of 10 mV for 10 h at 25° C. FIG. 31 shows the current density decay over 10 h and FIG. 32 shows the cell impedance both before (solid black line) and after (dotted gray line) the 10 h potential-hold experiment where the low frequency (left-most) semicircles represent the charge-transfer resistances. The resulting Li$^+$ transference number was 0.64 and thus that the Li$^+$ conductivity of a 5 m LiFSI—80TT:20SL electrolyte within a separator is 0.82 mS/cm. That is, the Li$^+$ conductivity for the 5 m LiFSI—80TT:20SL electrolyte is more than three times greater than the Li$^+$ conductivity of the commercial Li-ion electrolyte LP50 within a commercial separator.

Oxidative Stability

The oxidative stability of an electrolyte effectively determines the maximum positive electrode potential that can be achieved in a cell and thus an electrolyte is desirably stable against decomposition at both the negative and positive electrodes for a long cycle life. Accordingly, it is desirable for an electrolyte to be stable at potentials up to 5 V vs Li/Li$^+$ in order to facilitate the use of high potential cathode materials. Conventional carbonate-based electrolytes for Li-ion cells are typically stable up to about 4.3 V vs Li/Li$^+$ at room temperature (e.g., see K. Xu, *Chem. Rev.,* 2014, 114, 11503-11618).

Figure 33:
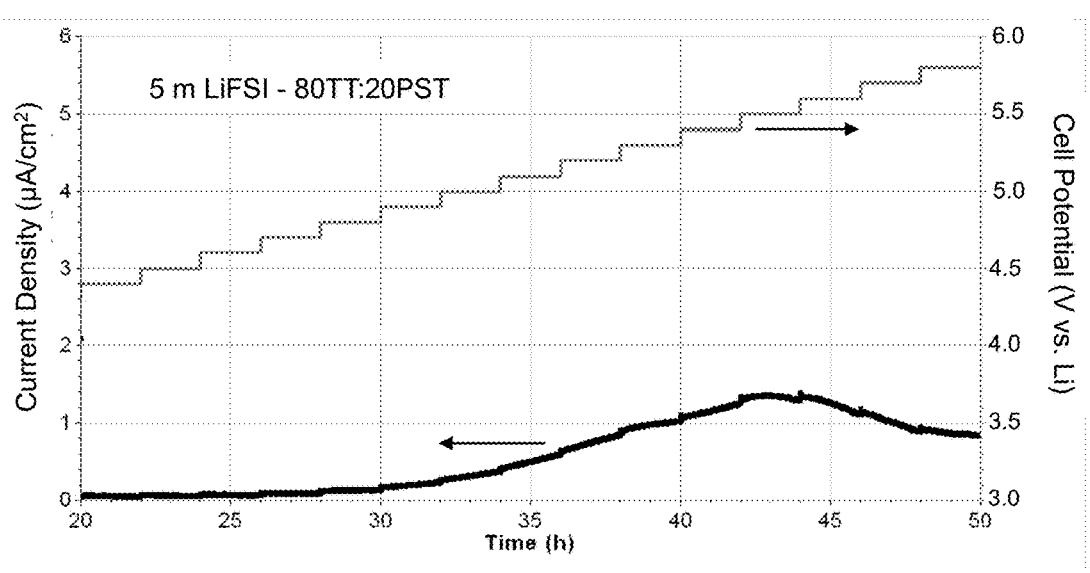
FIG. 33 shows oxidative stability of the electrolyte: 5 M LiFSI dissolved in 80TT:20PST in which the cell was held at each potential (grey line) for 2 h before increasing the potential by 0.1 V—the stability limit was deemed to be when the parasitic current (black line) reached w 1 µA/cm².
Figure 34:
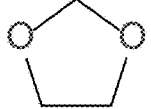
FIG. 34 shows chemical structure depictions for compounds in non-aqueous electrolytes according to the teachings of the present disclosure.
Figure 35:
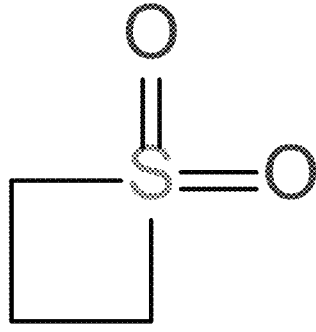
FIG. 35 shows additional chemical structure depictions for compounds in non-aqueous electrolytes according to the teachings of the present disclosure.
Figure 35:
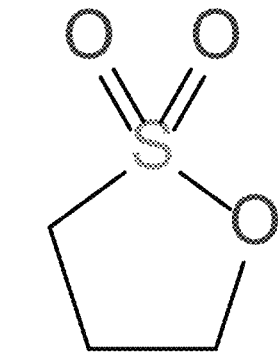
Figure 35:
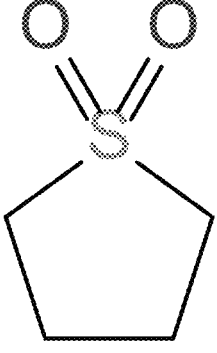
Figure 36:
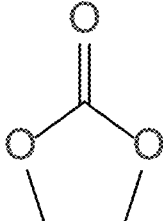
FIG. 36 shows still additional chemical structure depictions for compounds in non-aqueous electrolytes according to the teachings of the present disclosure.

The oxidative stability of the sulfone-based electrolytes according to the teachings of the present disclosure was measured using a Swagelok cell crafted and filled with a 5 m LiFSI—80TT:20PST electrolyte. For electrodes, aluminum foil, held in place by an aluminum rod, was employed as the working electrode while polished lithium foil, held in place by a stainless-steel rod, was used as the counter electrode. The working electrode was then subjected to a constant potential for 2 h while the parasitic current was measured. Then the potential was increased by 0.1 V and held there for another 2 h before repeating this step-wise potential increase. And as shown in FIG. 33, the 5 M LiFSI—80TT:20PST electrolyte was stable until the parasitic current exceeded 1 μA/cm$^2$, thereby revealing that this electrolyte was stable up to about 5.3 V vs Li/Li$^+$.

In order to further teach the present disclosure, but not to limit the teachings in any manner, synthesis examples of the various components for the sulfone-based electrolytes discussed above are provided below.

Example 1: Synthesis of thietane-1,1-dioxide (TT)

Reaction

Tungstic acid WO$_3$·H$_2$O, in the amounts from 0.5 g to 4 g, is added to distilled water, 100 to 1000 mL in volume. The pH of the solution is adjusted so that it falls to 11.0-12.0 region by addition of sodium hydroxide. The resulting white suspension of the sodium tungstate catalyst is cooled to 0-10° C. upon stirring, and then glacial acetic acid (5-250 mL) and trimethylene sulfide (thietane) (20-200 g) are added. The chilled mixture is stirred, and 30% hydrogen peroxide (100-800 mL) is added carefully with an addition funnel sufficiently slow so that the solution temperature does not exceed 10° C. at any moment. The mixture is stirred at 0-10° C. for an additional hour, and then heated to near dryness. The resulting semisolid material is triturated with hot chloroform. The number of times it is triturated can vary from one to ten; the chloroform volume in every portion can vary from 20 mL to 500 mL. The chloroform is filtered to remove the inorganic compounds and salts. The chloroform solutions are combined and dried over anhydrous magnesium sulfate, and the solvent is removed to produce a white solid (60.3-63.7 g, 0.57-0.60 mol, 88.7-93.7%) with a melting point between about 74-76° C. Optionally, the solvent can be removed using a rotary evaporator.

Example 2: Synthesis of 1,1,1-trifluoro-N,N-dimethylmethanesulfonamide ($CF_3SO_2NMe_2$)

$$CF_3SO_2Cl + 2NHMe_2 \rightarrow CF_3SO_2NMe_2 + NHMe_2 * HCl \qquad \text{Reaction:}$$

Dimethylamine is condensed into dichloromethane at the temperature significantly below melting point of dimethylamine (6° C.), preferably using dry ice cooling (−78° C.). The weight ratio of dimethylamine to dichloromethane can be varied in proportions 1:1 to 1:15, but is preferably kept in 1:2.5-1:6 region. To that mixture, trifluoromethanesulfonyl chloride is added dropwise, so that the molar ratio of trifluoromethanesulfonyl chloride to dimethylamine is kept in 1:2 to 1:6 region, preferably 1:3. During the addition and after it, the mixture is mechanically stirred and actively cooled down, so that the dimethylamine pressure does not exceed one atmosphere. After the end of the addition, the mixture is stirred while being kept at low temperature, preferably close to dry ice temperature (−78° C.). Then, the mixture is allowed to warm up to room temperature. After the mixture warms up to room temperature, distilled water is added in volume sufficient to dissolve the solids, such as close to one half of the organic phase volume. Then, the organic phase is separated from the aqueous phase and dried over anhydrous $Na_2SO_4$. The dichloromethane and the remaining dimethylamine are removed, which can be achieved, optionally, by evaporation in a rotary evaporator. This step produces the crude product, a pale yellow liquid. That liquid can be additionally purified by distillation under reduced pressure. The distillation step results in a yellowish liquid, yield 70%, with a boiling point of 68° C. at a pressure of 10 mmHg. Optionally, to ensure the low concentration of moisture dissolved in the product, dehydrating agents, such as molecular sieves, can be added to it.

Example 3: Synthesis of N-butyl-1,1,1-trifluoro-N-methylmethanesulfonamide ($CF_3SO_2NMeBu$)

$$CF_3SO_2Cl + 2NHMeBu \rightarrow CF_3SO_2NMeBu + NHMeBu*HCl \qquad \text{Reaction:}$$

N-methylbutylamine is mixed with dichloromethane and the mixture cooled down, using ice cooling (0° C.) or dry ice cooling (−78° C.). The weight ratio of N-methylbutylamine to dichloromethane can be varied in proportions 1:1 to 1:15, but is preferably kept in 1:2.5-1:6 region. To that mixture, trifluoromethanesulfonyl chloride is added dropwise, so that the molar ratio of trifluoromethanesulfonyl chloride to N-methylbutylamine is kept in 1:2 to 1:6 region, preferably 1:3. During the addition and after it, the mixture is mechanically stirred and actively cooled down, so that the total pressure does not exceed one atmosphere. After the end of the addition, the mixture is allowed to slowly warm up to room temperature. After the mixture warms up to room temperature, distilled water is added in volume sufficient to dissolve the solids, such as close to one half of the organic phase volume. Then, the organic phase is separated from the aqueous phase and dried over anhydrous $Na_2SO_4$. The dichloromethane and the remaining N-methylbutylamine are removed, which can be achieved, for example, by evaporation in a rotary evaporator. This step produces the crude product, a pale yellow liquid. That liquid can be additionally purified by distillation under reduced pressure. The distillation step results in a yellowish liquid, yield 70%. Optionally, to ensure the low concentration of moisture dissolved in the product, dehydrating agents, such as molecular sieves, can be added to it.

Example 4: Synthesis of 1,3-propane sultone (PST)

1,3-propane sultone is prepared by the sequence of reactions:

$$MHSO_3 + CH_2=CH-CH_2-OH \rightarrow HO-(CH_2)_3-SO_3M \qquad \text{Step 1:}$$

$$HO-(CH_2)_3-SO_3M \rightarrow HO-(CH_2)_3-SO_3H \qquad \text{Step 2:}$$

$$HO-(CH_2)_3-SO_3H \rightarrow propane\text{-}1,3\text{-}sultone + H_2O \qquad \text{Step 3:}$$

In Step 1, a solution of metal bisulfate $MHSO_3$ is prepared by dissolution of a commercially available metal hydrogen sulfite, such as $NaHSO_3$, or $KHSO_3$, in water. Optionally, such solution can be obtained by dissolving compounds that generate bisulfate ions, such as $Na_2S_2O_5$, or $K_2S_2O_5$. Optionally, such solution can be obtained by the reaction of $SO_2$ with metal compounds—sulfites or derivatives of acids less strong than sulfurous acid, such as oxides, hydroxides, carbonates, bicarbonates, but not limited to those. The metals can be ammonium, lithium, sodium, potassium, rubidium, cesium, magnesium, calcium, strontium, barium, aluminum, manganese, iron, cobalt, nickel, zinc, but not limited to those.

Allylic alcohol is quickly added to the solution of metal bisulfite while vigorously stirring that solution. The molar amount of the allylic alcohol should be close to that of the molar amount of sulfur in the bisulfite solution. Optionally, after that, a source of free radicals is introduced. Such source can be an aerial oxygen or pure oxygen that can be blown through the solution. It can also include radical initiators such as persulfate, hydrogen peroxide, percarbonate, but not limited to those. It can also include cations of metal cations such as Fe, Cu, Ce, Mn, V, but not limited to those. Optionally, organic free radicals, such as 2,2,6,6-Tetramethylpiperidine 1-oxyl, benzoyl peroxide, 2,2'-Azobis(2-methylpropionitrile), their soluble analogs, but not limited to those, can be used.

Optionally, the reaction mixture can be heated up to 55-60° C. The reaction is performed until the completion that can be determined by disappearance of the order of allylic alcohol, by iodometric titration, or by a spectroscopic technique. That technique may include, but is not limited, to nuclear magnetic resonance, infrared spectroscopy, Raman spectroscopy, in-situ Raman spectroscopy.

After the end of the reaction, most of water is evaporated from the solution. That evaporation may involve, but is not limited to, rotary evaporation, which may include application of a reduced pressure. After water evaporation ceases, an alcoholic solvent is added to the resulting mixture of products. That alcohol solvent can be a pure alcohol, including, but not limited to, methanol, ethanol, propanol, isopropanol, mixture of those, o combination of those including water. The volume of the alcohol solvent can be from 10% to 1000% of the volume of the original aqueous solution. The obtained solution of the metal 3-hydroxypropylsulfonate is filtered, the residue on the filter is rinsed with additional alcohol solvent, the alcohol fractions combined, and the alcohol solvent is removed to produce crude metal 3-hydroxypropylsulfonate. Optionally, the crude metal 3-hydroxypropylsulfonate can be recrystallized from an alcohol solvent that may be the same that was used for the extraction of the metal 3-hydroxypropylsulfonate, or have a different proportion of the constituents.

In Step 2, the metal 3-hydroxypropylsulfonate, optionally purified, is reacted with a strong acid, which includes, but is not limited to, hydrochloric acid, sulfuric acid, or a polymer acid. For example, the reaction with acid can be performed by addition of excess of sufficiently concentrated HCl, with alcohol solvent, such as ethanol, to potassium 3-hydroxypropylsulfonate. That addition results in precipitation of KCl, poorly soluble in ethanol, and dissolution of 3-hydroxypropylsulfonic acid. The KCl precipitate can be separated from the acid solution by filtration and rinsing the precipitate with excess of alcohol. Any type of reaction that leads to protonation of 3-hydroxypropylsulfonate anions into 3-hydroxypropylsulfonic acid, and physical separation of the 3-hydroxypropylsulfonic acid from the newly formed metal salt, is acceptable.

After that the excess of the solvent is removed to produce the crude 3-hydroxypropylsulfonic acid. Optionally, that solvent removal can be performed by solvent evaporation. Optionally, that evaporation can be performed under reduced pressure.

In Step 3, distillation of 3-hydroxypropylsulfonic acid results in its dehydration and conversion into propane-1,3-sultone. Optionally, that distillation can be performed under reduced pressure, such as 5-100 Torr. Optionally, the distillation temperature falls into 150-200° C. region. The melting point of the resulting solid is 31° C.

Example 5: Synthesis of ethylmethylsulfone

Reaction

Ethylmethylsulfide, 30% hydrogen peroxide, and catalyst are added to a round-bottom flask equipped with condenser. The hydrogen peroxide:ethylmethylsulfide molar ratio can be anywhere in between 2:1 to 6:1; the ethylmethylsulfide: catalyst molar ratio can be anywhere in between 1:0.001 to 1:1. Such catalysts as tungstic acid, freshly prepared from the reaction of sodium tungstanate and acetic acid, $(NMe_4)_4$ $H_8[Na_8Sb_3(Sb_2Mo_{12}O_{57})]\cdot17H_2O$, or another catalyst may be employed. The other catalysts that can be used include, but re not limited to $(NH_4)_6Mo_7O_{24}\cdot4H_2O$, $Na_2MoO_4\cdot2H_2O$, $H_3PMo_{12}O_{40}$, $H_4SiMo_{12}O_{40}$, $H_6As_2Mo_{18}O_{62}$, $H_3PW_{12}$ $O_{40}$, $H_4GeW_{12}O_{40}$, $H_4SiW_{12}O_{40}$. The absolute amounts of ethylmethylsulfide being oxidized can vary from millimole to moles; the reaction vessel volume can vary accordingly. The components may be brought together simultaneously; alternatively, hydrogen peroxide may be added to the reaction mixture dropwise. The addition can be performed on cooling the reaction mixture to below room temperature. After one hour after the end of the hydrogen peroxide addition, the mixture can be allowed to warm up to room temperature for one hour, and then heated up to increased temperature, such as 35° C. or 40° C. for another hour while being vigorously stirred. Then, the mixture is heated to remove most of water, and triturated with dichloromethane or chloroform. The number of times it was triturated can vary from one to ten; the dichloromethane or chloroform volume in every portion can vary from 2% to 90% of the flask volume. Then, the resulting extracts are combined and dehydrated with sodium sulfate or magnesium sulfate. After that, the solution of ethylmethylsulfone in dichloromethane or chloroform is filtered and the chlorinated solvent removed by evaporation. Optionally, that evaporation can be performed in a rotary evaporator. Optionally, that evaporation can be performed under reduced pressure. The procedure produces the desired ethylmethylsulfone with yield close to 100%.

Example 6: Synthesis of Sulfone-Based Electrolytes

Electrolyte formulation includes a mixture of lithium salts and an organic solvent blend in addition to additives. The lithium salt(s) may be a mixture. A non-exhaustive list of example lithium salts includes lithium bis(trifluoromethanesulfonyl)imide, lithium bis (fluorosulfonyl)imide, and lithium bis(oxalate)borate, lithium hexafluorophosphate, lithium hexafluoroarsenate, lithium tetrafluoroborate, lithium tetracyanoborate, lithium perchlorate, lithium tris ((trifluoromethanesulfonyl)methanide, and lithium tetrafluorooxalatophosphate. The lithium salt concentration may be in the range of 0.1 molal to 24 molal. The formulation may contain both cyclic and linear sulfones in combination with sulfonamides, carbonates, ethers, polyethers, nitriles, and amides. A non-exhaustive list of solvents may include thietane-1,1-dioxide, sulfolane, 1,3-oxathiolane-3,3-dioxide, propane-1,3-sultone, 1,3,2-dioxathiolane 2,2-dioxide, succinonitrile, N,N,N,N'-tertamethylsulfamide, 1,4-oxathiane, 4,4-dioxide, ethylene carbonate, propylene carbonate, trimethylene carbonate, dimethyl carbonate, methyl ethyl carbonate or diethyl carbonate.

Example 8: Synthesis of 5 M LiFSI in 80TT:20PST

A solution of 5 molal LiFSI in 80 wt % thietane-1,1-dioxide, 20 wt % propane-1,3-sultone was created inside an Ar-filled glove box ($H_2O$ and O2<0.1 ppm) as follows. 2.0403 g of LiFSI (0.0109 mol) was added to a 5 mL vial containing a stir bar. 1,3-Propane sultone was heated on a hot plate at about 60° C. until it melted. Then, 0.4376 g of 1,3-propane sultone was added dropwise, using a pipette, to the vial containing LiFSI. The vial was then placed onto the hot plate (at about 60° C.). Thietane-1,1-dioxide powder was added in small portions so that each portion melted/combined with the existing solution within the vial while being stirred. A total of 1.7440 g of thietane-1,1-dioxide was added to the vial.

Example 9: Preparation of Lithium bis(trifluoromethanesulfonyl)imide in thietane-1,1-dioxide-propane-1,3-sultone Anhydrous thietane-1,1-dioxide, propane-1,3-sultone, and lithium bis(trifluoromethanesulfonyl)imide are mixed in an atmosphere from which oxygen and water vapors were rigorously excluded. For example, that mixing can be performed in an argon-filled glove box. The weight fraction of thietane-1,1-dioxide in the solvent mixture can range from 0% to 100% while that of propane-1,3-sultone can also range from 0% to 100%. The weight ratio of salt (such as lithium bis(trifluoromethanesulfonyl)imide) to solvent can range from 0.01 to 6. All components can be added as solids. Optionally, propane-1,3-sultone can be melted before the addition and added in a liquid form. Optionally, thietane-1, 1-dioxide can be melted before the addition and added in a liquid form. Optionally, after the addition, the mixture can be liquefied by heating, and stirred to produce a homogenous solution.

Example 10: Preparation of Lithium bis(fluoro-sulfonyl)imide in thietane-1,1-dioxide-1,1,1-trif-luoro-N,N-dimethylmethanesulfonamide Anhydrous thietane-1,1-dioxide, 1,1,1-trifluoro-N,N-dimethylmethanesulfonamide, and lithium bis(fluorosulfonyl) imide are mixed together in an atmosphere from which oxygen and water vapors were rigorously excluded. For example, that mixing could be performed in an argon-filled glove box. The weight fraction of thietane-1,1-dioxide in the solvent mixture can range from 0% to 100% while that of 1,1,1-trifluoro-N,N-dimethylmethanesulfonamide can also range from 0% to 100%. The weight ratio of salt (such as lithium bis(fluorosulfonyl)imide) to solvent can range from 0.01 to 6. Thietane-1,1-dioxide can be added as a solid. Optionally, thietane-1,1-dioxide can be melted before the addition and added in a liquid form. Optionally, after the addition, the mixture can be liquefied by heating, and stirred to produce a homogenous solution.

Example 11: Preparation of a Solution of a Mixture of Salts, Such as Lithium bis(trifluoromethanesulfonyl)imide, Lithium bis (fluorosulfonyl)imide, and Lithium bis(oxalate)borate, in a Mixture of Solvents, Such as thietane-1,1-dioxide-sulfolane Anhydrous lithium bis(trifluoromethanesulfonyl)imide, lithium bis (fluorosulfonyl)imide, lithium bis(oxalate)borate, thietane-1,1-dioxide, and sulfolane are mixed in an atmosphere from which oxygen and water vapors were rigorously excluded. For example, that mixing can be performed in an argon-filled glove box. The weight fraction of each salt, such as lithium bis(trifluoromethanesulfonyl)imide, lithium bis (fluorosulfonyl)imide, and lithium bis(oxalate)borate, can range from 0% to 100% in the salt mixture. The weight fraction of each solvent, such as thietane-1,1-dioxide or sulfolane, can range from 0% to 100% in the solvent mixture. The weight ratio of salt mixture to solvent can range from 0.01 to 6. The components can be added to the mixture sequentially. Alternatively, some combinations of the ingredients can be pre-mixed. For example, the salts can be mixed together and, separately, the solvents can be combined together into a solvent combination. Subsequently, those combinations of the components can be combined into the whole mixture. All components can be added as solids. Optionally, sulfolane can be melted before the addition and added in a liquid form. Optionally, thietane-1,1-dioxide can be melted before the addition and added in a liquid form. Optionally, after the addition, the mixture can be liquefied by heating, and stirred to produce a homogenous solution.

Example 12: Formulation of an Electrolyte that Incorporates an Additive

Anhydrous thietane-1,1-dioxide, propane-1,3-sultone, and lithium bis (fluorosulfonyl)imide are mixed in an atmosphere from which oxygen and water vapors were rigorously excluded. For example, mixing in an argon-filled glove box. The weight fraction of thietane-1,1-dioxide in the solvent mixture can range from 0% to 100% while that of propane-1,3-sultone can also range from 0% to 100%. The weight ratio of salt (such lithium bis (fluorosulfonyl)imide) to solvent can range from 0.01 to 6. All components can be added as solids. Optionally, propane-1,3-sultone can be melted before the addition and added in a liquid form. Optionally, 1,3-oxathiolane-3,3-dioxide can be melted before the addition and added in a liquid form. The minor components (additives) can be placed to the electrolyte mixture at any point of the mixture preparation. Such additives can be, but not limited to, 1-propene-1,3-sultone, 3-methyl-4-phenyl-2,5-oxazolidinedione, or others. Each of those components constitutes 0.05-5% weight percent of the resulting electrolyte. Those compounds can be added as solids or liquids. Optionally, after the addition, the mixture can be liquefied by heating, and stirred to produce a homogenous solution.

Example 13: Preparation of Lithium bis (fluorosulfonyl)imide Solution in 1,3-oxathiolane-3,3-dioxide-propane-1,3-sultone Mixture Anhydrous 1,3-oxathiolane-3,3-dioxide, propane-1,3-sultone, and lithium bis (fluorosulfonyl)imide are mixed in an atmosphere from which oxygen and water vapors were rigorously excluded. For example, that mixing can be performed in an argon-filled glove box. The weight fraction of 1,3-oxathiolane-3,3-dioxide in the solvent mixture can range from 0% to 100% while that of propane-1,3-sultone can also range from 0% to 100%. The weight ratio of salt (such lithium bis (fluorosulfonyl)imide) to solvent can range from 0.01 to 6. All components can be added as solids. Optionally, propane-1,3-sultone can be melted before the addition and added in a liquid form. Optionally, 1,3-oxathiolane-3,3-dioxide can be melted before the addition and added in a liquid form. Optionally, after the addition, the mixture can be liquefied by heating, and stirred to produce a homogenous solution.

The preceding description is merely illustrative in nature and is in no way intended to limit the disclosure, its application, or uses. Work of the presently named inventors, to the extent it may be described in the background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple variations or forms having stated features is not intended to exclude other variations or forms having additional features, or other variations or forms incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one variation, or various variations means that a particular feature, structure, or characteristic described in connection with a form or variation or particular system is included in at least one variation or form. The appearances of the phrase "in one variation" (or variations thereof) are not necessarily referring to the same variation or form. It should be also understood that the various method steps discussed herein do not have to be carried out in the same order as depicted, and not each method step is required in each variation or form.

The foregoing description of the forms and variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

What is claimed is:

1. A non-aqueous electrolyte consisting essentially of:

(a) at least 97 weight percent (wt. %) of a mixture comprising:

a solvent; and a Group 1 salt excluding lithium nitrate dissolved in the solvent;

the solvent consisting of: at least 50 wt. % of a sulfone compound and at least 20 wt. % of a saturated sultone compound;

the concentration of the Group 1 salt dissolved in the solvent being between 0.1 molal and 24 molal; and (b) optionally, 3 wt. % or less of at least one additive selected from the group consisting of a lithium salt excluding lithium nitrate, a polyunsaturated compound, a cyclic anhydride, a cyclic unsaturated sultone, and a cyclic phosphate, the non-aqueous electrolyte comprising a coulombic efficiency with respect to plating and stripping of lithium of at least 80%.

2. The non-aqueous electrolyte according to claim 1, wherein the Group 1 salt is at least one of lithium bis (trifluoromethanesulfonyl)imide, lithium bis (fluorosulfonyl)imide, lithium bis(oxalate)borate, lithium hexafluorophosphate, lithium hexafluoroarsenate, lithium tetrafluoroborate, lithium tetracyanoborate, lithium perchlorate, lithium tris(trifluoromethanesulfonyl)methanide, lithium tetrafluorooxalatophosphate, and any combination thereof.

3. The non-aqueous electrolyte according to claim 1, wherein the sulfone compound includes a cyclic sulfone, and the cyclic sulfone is selected from the group consisting of thietane-1,1-dioxide and sulfolane.

4. The non-aqueous electrolyte according to claim 1, wherein the non-aqueous electrolyte includes at least 0.05 weight percent (wt. %) of the at least one additive, the lithium salt is lithium bis(oxalate)borate, the polyunsaturated compound is selected from the group consisting of triallyl cyanurate and triallyl isocyanurate, the cyclic anhydride is 3-methyl-4-phenyl-oxazolidine-2,5-dione, the cyclic unsaturated sultone is 1-propene-1,3-sultone, and the cyclic phosphate is 2-(allyloxy)-1,3,2-dioxaphospholane 2-oxide.

5. A non-aqueous electrolyte consisting essentially of:

(a) at least 97 weight percent (wt. %) of a mixture comprising:

a solvent; and a lithium salt excluding lithium nitrate dissolved in the solvent;

the solvent consisting of:

at least 50 weight percent (wt. %) of thietane-1,1-dioxide or 1,3-oxathiolane-3,3-dioxide; and 1,3-propane sultone, sulfolane, or N-butyl-1,1,1,-trifluoro-N-methylmethanesulfonamide, and the lithium salt concentration being between 0.1 molal and 24 molal; and (b) optionally, 3 wt. % or less of at least one additive selected from the group consisting of another lithium salt excluding lithium nitrate, a polyunsaturated compound, a cyclic anhydride, a cyclic unsaturated sultone, and a cyclic phosphate, the non-aqueous electrolyte comprising a coulombic efficiency with respect to plating and stripping of lithium of at least 80%.

6. The non-aqueous electrolyte according to claim 5, wherein the lithium salt is at least one of lithium bis (trifluoromethanesulfonyl)imide, lithium bis (fluorosulfonyl)imide, lithium bis(oxalate)borate, lithium hexafluorophosphate, lithium hexafluoroarsenate, lithium tetrafluoroborate, lithium tetracyanoborate, lithium perchlorate, lithium tris((trifluoromethanesulfonyl)methanide, lithium tetrafluorooxalatophosphate, and any combination thereof.

7. The non-aqueous electrolyte according to claim 5, wherein the non-aqueous electrolyte includes at least 0.05 weight percent (wt. %) of the at least one additive, the another lithium salt is lithium bis(oxalate)borate, the polyunsaturated compound is selected from the group consisting of triallyl cyanurate and triallyl isocyanurate, the cyclic anhydride is 3-methyl-4-phenyl-oxazolidine-2,5-dione, the cyclic unsaturated sultone is 1-propene-1,3-sultone, and the cyclic phosphate is 2-(allyloxy)-1,3,2-dioxaphospholane 2-oxide.

8. The non-aqueous electrolyte according to claim 5, wherein the solvent consist of at least 20 wt. % of sulfolane, N-butyl-1,1,1-trifluoro-N-methylmethane-sulfonamide, or 1,3-propane sultone.

9. The non-aqueous electrolyte according to claim 7, wherein the at least one additive is 3-methyl-4-phenyl-oxazolidine-2,5-dione, 1-propene-1,3-sultone, 2-(allyloxy)-1,3,2-dioxaphospholane 2-oxide, or any combination thereof.

10. The non-aqueous electrolyte of claim 9, further comprising a coulombic efficiency with respect to plating and stripping of lithium of at least 90%.

11. The non-aqueous electrolyte according to claim 1, wherein the solvent consists of at least 50 wt. % of the saturated sultone compound.

12. The non-aqueous electrolyte according to claim 1, wherein the sulfone compound is thietane-1,1-dioxide and/ or the saturated sultone compound is 1,3-propane sultone.

13. The non-aqueous electrolyte according to claim 4, wherein the at least one additive is 3-methyl-4-phenyl-oxazolidine-2,5-dione, 1-propene-1,3-sultone, 2-(allyloxy)-1,3,2-dioxaphospholane 2-oxide, or any combination thereof.

\* \* \* \* \*